United States Patent
Grzechnik

(10) Patent No.: US 8,494,553 B2
(45) Date of Patent: Jul. 23, 2013

(54) POSITION DETERMINATION USING HORIZONTAL ANGLES

(75) Inventor: Slawomir K. Grzechnik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/082,301

(22) Filed: Apr. 7, 2011

(65) Prior Publication Data

US 2012/0178469 A1 Jul. 12, 2012

Related U.S. Application Data

(60) Provisional application No. 61/431,732, filed on Jan. 11, 2011.

(51) Int. Cl.
*H04W 24/00* (2009.01)

(52) U.S. Cl.
USPC .......... 455/456.1; 455/404.2; 455/414.2; 455/432.1; 455/556.1; 348/14.02; 348/158

(58) Field of Classification Search
USPC .......... 455/456.1, 404.2, 414.2, 432.1, 556.1; 348/14.02, 158
See application file for complete search history.

(56) References Cited

U.S. PATENT DOCUMENTS

| | | | |
|---|---|---|---|
| 3,859,731 A | 1/1975 | Endo | |
| 6,363,250 B1 | 3/2002 | Lindell | |
| 6,408,251 B1 | 6/2002 | Azuma | |
| 7,440,610 B1 | 10/2008 | Wirtz et al. | |
| 7,630,737 B2 * | 12/2009 | Pande et al. | 455/556.1 |
| 2005/0246099 A1 | 11/2005 | Jendbro et al. | |
| 2009/0080697 A1 * | 3/2009 | Kishikawa et al. | 382/103 |
| 2011/0153250 A1 | 6/2011 | Bailey | |
| 2012/0155382 A1 | 6/2012 | Grzechnik et al. | |
| 2012/0155770 A1 | 6/2012 | Grzechnik et al. | |

FOREIGN PATENT DOCUMENTS

| | | |
|---|---|---|
| EP | 0427431 A2 | 5/1991 |
| KR | 20100060472 A | 6/2010 |
| WO | WO9305474 A1 | 3/1993 |
| WO | WO03093762 A1 | 11/2003 |
| WO | WO2009098154 A1 | 8/2009 |

OTHER PUBLICATIONS

Deutscher Hochseesportverband., "Hansa" e.V.: "Seemannschaft Handbuch fuer den Yachtsport passage", 2003, Delius Klasing Verlag, Bielefeld, 26th edition, pp. 502-503, XP007920486, ISBN: 3-7688-0523-9.

(Continued)

*Primary Examiner* — Nghi H Ly

(57) ABSTRACT

An access terminal of a wireless communication system includes a transceiver configured to receive wirelessly multiple reference keypoints and a geographical location of each respective reference keypoint, each geographical location being a location near an estimated position of the access terminal; at least one camera communicatively coupled to the transceiver and configured to capture an image; and a processor communicatively coupled to the at least one camera and configured to calculate a refined position of the access terminal, that is more accurate than the estimated position, using first and second horizontal angles between the geographical locations of respective first and second pairs of reference keypoints determined as each corresponding to a respective image keypoint identified within the image captured by the at least one camera.

29 Claims, 11 Drawing Sheets

OTHER PUBLICATIONS

Hoff B. et al., "Autocalibration of an electronic compass in an outdoor augmented reality system", In Proc. ISAR 2000, pp. 159-164, 2000.

International Search Report and Written Opinion—PCT/US2012/020986—ISA/EPO—Apr. 23, 2012.

Kiyohide Satoh et al.,"A Hybrid Registration Method for Outdoor Augmented Reality,"ISAR, pp. 67, IEEE and ACM International Symposium on Augmented Reality (ISAR'01), 2001.

Liebe C.C. et al.,"Algorithms Onboard the Oersted Microsatellite Stellar Compass", Proceedings of the SPIE—The International Society for Optical Engineering, vol. 2810, 1996, pp. 239-251, XP002654563, SPIE-Int. Soc. Opt. Eng. USA ISSN: 0277-78.

"Magnetic Declination", ODOT Surveyors Conference, Feb. 2004, pp. 1-4, XP002654564, Retrieved from the Internet: URL:www.Oregon.gov/ODOT/HWY/GEOMETRONICS/docs/TheCompass.pdf"ga=t [retrieved on Oct. 20, 2011] p. 1, paragraph 1-8.

Schall G. et al., "Global Pose Estimation Using Multi-Sensor Fusion for Outdoor Augmented Reality", In Proc. ISMAR 2009, pp. 153-162, Orlando, Florida, USA, 2009.

Vooren R.,"Leidraad Voor Kajuitjachtzeilers", 2001, Het Goede Boek, Huizen,3rd edition, pp. 198-199, XP007920485.

* cited by examiner

POSITION DETERMINATION USING HORIZONTAL ANGLES

CROSS-REFERENCES TO RELATED APPLICATIONS

This application claims the benefit of U.S. Provisional Application No. 61/431,732, filed Jan. 11, 2011, entitled "Position Determination Using Horizontal Angles," the entirety of which is herein incorporated by reference for all purposes.

BACKGROUND

Wireless communication systems are widely deployed to provide various communication services and location services to mobile users. Users in the system rely on position determination functionality to provide location services including navigation, location-based services, and point-of-interest applications.

A number of techniques exist to determine position of an access terminal in a wireless communication system, including Global Positioning System (GPS) techniques, Assisted GPS (A-GPS), and cell-based positioning methods such as Cell of Origin (COO), Time of Arrival (TOA), and Angle of Arrival (AOA). These techniques have varying degrees of precision, which may not provide the accuracy needed by many of today's location-based services. For example, GPS positioning can be especially inaccurate in urban environments, where tall, densely packed buildings can restrict views of satellites and the reflective surfaces of buildings can cause multipath effects.

One technique that improves on the accuracy of GPS in urban environments uses computer vision methods to determine position of access terminals equipped with cameras. These methods aim to solve a three-dimensional problem of finding extrinsic camera parameters (i.e., position and orientation) by minimizing the reprojection error between projections of object points and corresponding points identified on a camera image, e.g., using non-linear least squares minimization. A least squares approach can be optimized with iterative numerical methods, which are computationally expensive and cost prohibitive to implement in access terminals.

SUMMARY

An example of an access terminal of a wireless communication system according to the disclosure includes a transceiver configured to receive wirelessly multiple reference keypoints and a geographical location of each respective reference keypoint, each geographical location being a location near an estimated position of the access terminal; at least one camera communicatively coupled to the transceiver and configured to capture an image; and a processor communicatively coupled to the at least one camera and configured to calculate a refined position of the access terminal, that is more accurate than the estimated position, using first and second horizontal angles between the geographical locations of respective first and second pairs of reference keypoints determined as each corresponding to a respective image keypoint identified within the image captured by the at least one camera.

Embodiments of such an access terminal may include one or more of the following features. The transceiver is further configured to wirelessly transmit the estimated position of the access terminal as a request for the multiple reference keypoints and geographical locations. The processor is further configured to calculate the refined position as an intersection of first and second position circles each defined by the respective first and second horizontal angles. The processor is further configured to calculate a center of each of the first and second position circles; calculate squares of radius of each of the first and second position circles; define an equation for each of the first and second position circles using the respective calculated centers and squares of radius; and calculate the intersection of the first and second position circles by solving the equations for the first and second position circles. The processor is further configured to select the determined keypoints for each of the first and second pairs so that each of the first and second horizontal angles is between 30 degrees and 120 degrees. The transceiver is further configured to wirelessly receive additional reference keypoints and an additional geographical location of each respective additional reference keypoint, each additional geographical location being a location near an estimated future position of the access terminal. The processor is further configured to track motion of the access terminal to estimate the future position of the access terminal. The at least one camera is configured to capture multiple images; and the processor is further configured to combine the multiple images into a composite image. The at least one camera is multiple cameras arranged in a fan-like pattern on the access terminal with a combined effective horizontal angle of view of at least 80 degrees.

An example of an apparatus configured to determine position of an access terminal of a wireless communication system includes means for receiving multiple reference keypoints and a geographical location of each respective reference keypoint wirelessly at the access terminal, each geographical location being a location near an estimated position of the access terminal; means for determining at least three of the reference keypoints as each corresponding to a respective image keypoint within an image captured by the access terminal; and means for calculating a refined position of the access terminal, that is more accurate than the estimated position, using first and second horizontal angles between the geographical locations of respective first and second pairs of the determined keypoints.

Embodiments of such an apparatus may include the following features. The apparatus further includes means for wirelessly transmitting the estimated position of the access terminal from the access terminal as a request for the multiple reference keypoints and geographical locations. The apparatus further includes means for identifying multiple image keypoints within the image captured by the access terminal; and means for searching the multiple reference keypoints for the identified image keypoints. The means for calculating include means for calculating a center of each of first and second position circles each defined by the respective first and second horizontal angles; means for calculating squares of radius of each of the first and second position circles; means for defining an equation for each of the first and second position circles using the respective calculated centers and squares of radius; and means for calculating an intersection of the first and second position circles by solving the equations for the first and second position circles, wherein the refined position of the access terminal is calculated as the intersection. The means for calculating include means for selecting the determined keypoints for each of the first and second pairs so that each of the first and second horizontal angles is between 30 degrees and 120 degrees. The apparatus further includes means for receiving additional reference keypoints and an additional geographical location of each respective additional reference keypoint wirelessly at the access terminal, each additional geographical location being a location near an estimated future position of the access terminal.

An example of a computer program product includes a processor-readable medium storing processor-readable instructions configured to cause a processor to receive multiple reference keypoints and a geographical location of each respective reference keypoint wirelessly at an access terminal of a wireless communication system, each geographical location being a location near an estimated position of the access terminal; determine at least three of the reference keypoints as each corresponding to a respective image keypoint within an image captured by the access terminal; and calculate a refined position of the access terminal, that is more accurate than the estimated position, using first and second horizontal angles between the geographical locations of respective first and second pairs of the determined keypoints.

Embodiments of such a computer program product may include one or more of the following features. The computer program product further includes instructions configured to cause the processor to transmit wirelessly the estimated position of the access terminal from the access terminal as a request for the multiple reference keypoints and geographical locations. The computer program product further includes instructions configured to cause the processor to identify multiple image keypoints within the image captured by the access terminal; and search the multiple reference keypoints for the identified image keypoints. The instructions configured to cause the processor to calculate the refined position of the access terminal are configured to cause the processor to calculate a center of each of first and second position circles each defined by the respective first and second horizontal angles; calculate squares of radius of each of the first and second position circles; define an equation for each of the first and second position circles using the respective calculated centers and squares of radius; and calculate an intersection of the first and second position circles by solving the equations for the first and second position circles, wherein the refined position of the access terminal is calculated as the intersection. The instructions configured to cause the processor to calculate the refined position are configured to cause the processor to select the determined keypoints for each of the first and second pairs so that each of the first and second horizontal angles is between 30 degrees and 120 degrees.

An example of a method of determining position of an access terminal of a wireless communication system includes receiving multiple reference keypoints and a geographical location of each respective reference keypoint wirelessly at the access terminal, each geographical location being a location near an estimated position of the access terminal; determining at least three of the reference keypoints as each corresponding to a respective image keypoint within an image captured by the access terminal; and calculating a refined position of the access terminal, that is more accurate than the estimated position, using first and second horizontal angles between the geographical locations of respective first and second pairs of the determined keypoints.

Embodiments of such a method may include one or more of the following features. The method further includes identifying multiple image keypoints within the image captured by the access terminal; and searching the multiple reference keypoints for the identified image keypoints. Calculating the refined position includes calculating the refined position as an intersection of first and second position circles each defined by the respective first and second horizontal angles. Calculating the refined position includes calculating a center of each of the first and second position circles; calculating squares of radius of each of the first and second position circles; defining an equation for each of the first and second position circles using the respective calculated centers and squares of radius; and calculating the intersection of the first and second position circles by solving the equations for the first and second position circles. Calculating the refined position includes selecting the determined keypoints for each of the first and second pairs so that each of the first and second horizontal angles is between 30 degrees and 120 degrees. The method further includes receiving additional reference keypoints and an additional geographical location of each respective additional reference keypoint wirelessly at the access terminal, each additional geographical location being a location near an estimated future position of the access terminal. Determining at least three of the reference keypoints includes determining multiple keypoint correspondences between descriptors of reference keypoints and descriptors of image keypoints, each keypoint correspondence being a pair of a reference keypoint and an image keypoint matched by descriptor similarity; and performing geometric verification on the multiple keypoint correspondences until a predetermined number of keypoint correspondences are matched by geometric constraints. Calculating a refined position of the access terminal includes calculating multiple positions of the access terminal, each position calculated using respective first and second horizontal angles between the geographical locations of respective first and second pairs of the determined keypoints; and calculating the refined position as a mean of the multiple positions. Calculating the refined position as the mean of the multiple positions includes identifying as an outlier at least one of the multiple positions; and calculating the refined position as the mean of the multiple positions with the at least one identified outlier excluded from the calculation.

Items and/or techniques described herein may provide one or more of the following capabilities. Position determination using horizontal angles may provide better accuracy than GPS, especially in urban environments. Position can be determined using horizontal angles between identified points with known geographical locations without relying on magnetic measurements, and thus without magnetic corrections used by classic navigation methods utilizing compass bearings. Unlike the computationally expensive computer vision methods that use iterative numerical methods to solve non-linear three-dimensional minimization problems, position determination using horizontal angles is computationally inexpensive with a two-dimensional analytic closed-form solution. Typically, position determination using horizontal angles includes measuring simultaneously two adjacent angles, each between 30 degrees and 60 degrees, and thus a camera with angle of view at least between 60 degrees and 120 degrees would be needed. Such wide-angle cameras exist but are very expensive and introduce significant distortions into the image. However, using multiple off-the-shelf cameras, each with a moderate angle of view, effectively increases the overall angle of view of the optical system while introducing small distortions that are easy to compensate, as opposed to using expensive wide-angle cameras. These cameras are inexpensive while providing high image quality. From the user experience perspective, mounting multiple cameras on an access terminal provides the ability to merge images from the cameras into a single panorama on the access terminal display. While item/technique-effect pairs have been described, it may be possible for a noted effect to be achieved by means other than those noted, and a noted item/technique may not necessarily yield the noted effect.

In the figures, components with similar relevant characteristics and/or features may have the same reference label.

DETAILED DESCRIPTION

Techniques described herein provide mechanisms for determining position of an access terminal using horizontal angles between objects with known geographical locations. For example, if natural or man-made objects are identified in an image taken by a camera system of the access terminal, horizontal angles between the objects can be determined using just the camera image. Three such objects are needed for this technique. If the geographical locations of these objects are also known, the geographical position of the access terminal can be determined. The camera system is understood to include one or more cameras mounted on the access terminal and covering sufficient span of the horizon with their combined angle of view.

Techniques described herein may be used for various wireless communication systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Figure 1:
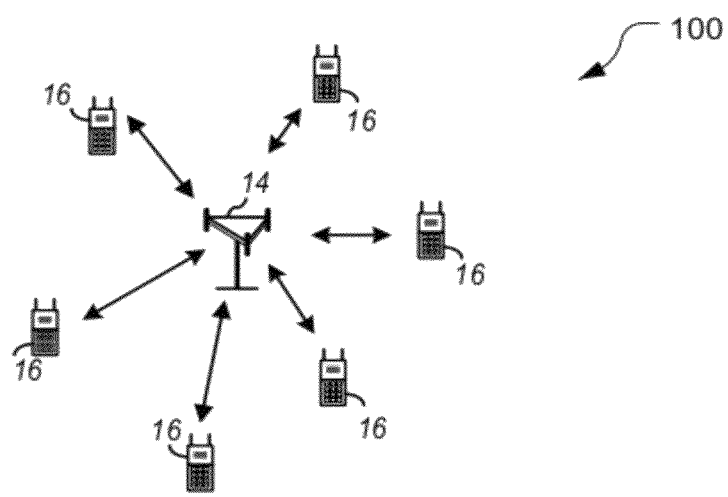
FIG. 1 is a simplified diagram of a wireless communication system, including a base station and access terminals.

Referring to FIG. 1, a wireless communication system 100 includes a base transceiver station (BTS) 14 and mobile access terminals 16 (ATs). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier.

The BTS 14 can wirelessly communicate with the ATs 16. The BTS 14 may also be referred to as an access point, an access node (AN), a Node B, an evolved Node B (eNB), etc. The BTS 14 can be configured to communicate with the ATs 16 via multiple carriers. The BTS 14 can provide communication coverage for a respective geographic area, for example, a cell (not shown).

The ATs 16 may be referred to as mobile stations, mobile devices, user equipment (UE), or subscriber units. The ATs 16 here include cellular phones and a wireless communication device, but can also include personal digital assistants (PDAs), other handheld devices, netbooks, notebook computers, etc.

Figure 2:
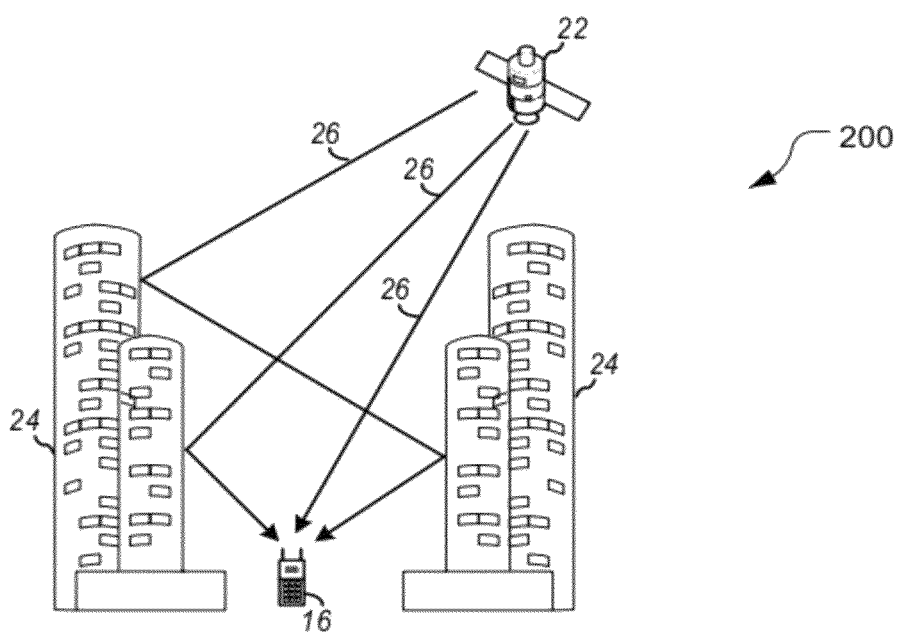
FIG. 2 is a simplified diagram of an access terminal shown in FIG. 1 receiving positioning information from a satellite in an urban environment, where satellite signals reflected from building walls introduce significant errors into GPS positioning.

Referring to FIG. 2, a satellite 22 can wirelessly communicate with an AT 16 in an urban environment 200. The satellite 22 can be part of a global navigation satellite system, e.g., the Global Positioning System (GPS), the GLObal NAvigation Satellite System (GLONASS), or the Galileo system. Here, the satellite 22 is a GPS satellite with a transmitter capable of transmitting information about the position of the AT 16. The AT 16 includes a GPS receiver capable of wirelessly receiving position information from the satellite 22. The position information transmitted can include an estimated geographical position of the AT 16. For example, the position of the AT 16 can be specified by geographical latitude and longitude and optionally geodetic altitude.

The AT 16 of FIG. 2 is located in an urban environment 200. GPS positioning can be especially unreliable in the canyon-like landscape of modern streets in urban environments. For example, tall, densely packed buildings 24 can restrict view of the satellite 22 and large reflecting surfaces of modern buildings 24 can cause multiple transmission paths 26 leading to wrong position determination. The highly disturbed GPS position information can limit the usability of location services (e.g., navigation, location-based services, and point-of-interest applications) available to the AT 16 in the urban environment 200.

Figure 3:
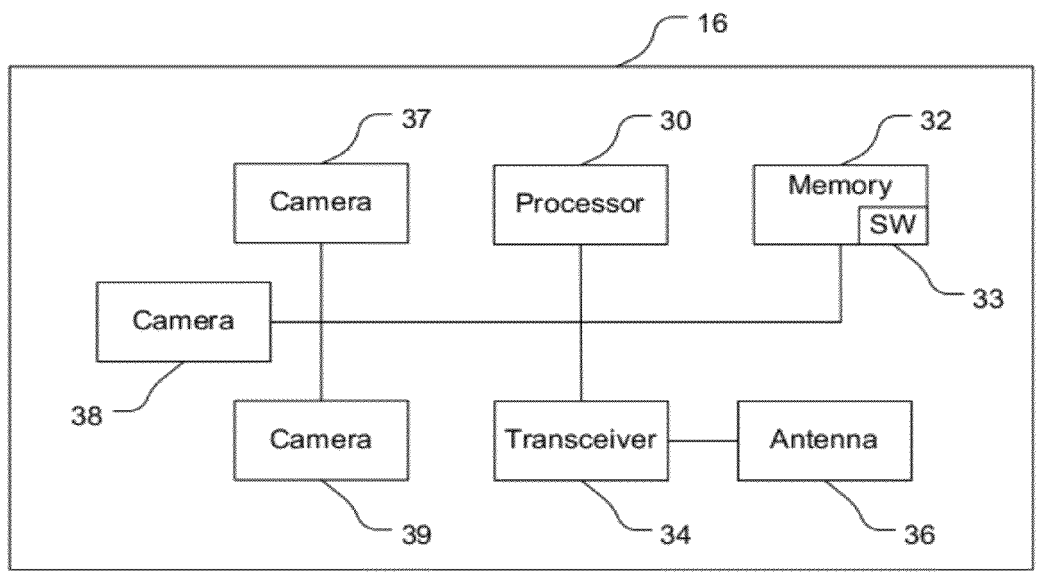
FIG. 3 is a block diagram of components of an access terminal shown in FIG. 1.

Referring to FIG. 3, an exemplary one of the ATs 16 comprises a computer system including a processor 30, memory 32, a transceiver 34, an antenna 36, and a camera 38. The transceiver 34 is configured to communicate bi-directionally with the BTS 14 via the antenna 36. The transceiver 34 is configured, for example, to transmit a request to the BTS 14 for reference keypoints and their geographical locations near an estimated position of the AT 16 and to receive multiple reference keypoints and geographical locations in response to the request. In some implementations, descriptors for the multiple reference keypoints are also received in response to the request. Descriptors are described in further details below. In some implementations, the transceiver 34 is further configured to receive wirelessly information (e.g., an estimated position of the AT 16) from the satellite 22 of FIG. 2. Alternatively, the computer system can further include another receiver (not shown) configured to wirelessly receive information from the satellite 22 via another antenna (not shown). The processor 30 is preferably an intelligent hardware device, e.g., a central processing unit (CPU) such as ARM, Intel®, or AMD® processors, a microcontroller, an application specific integrated circuit (ASIC), etc. The memory 32 includes random access memory (RAM) and read-only memory (ROM). The memory 32 stores computer-readable, computer-executable software code 33 containing instructions that are configured to, when executed, cause the processor 30 to perform various functions described herein. Alternatively, the software 33 may not be directly executable by the processor 30 but configured to cause the computer, e.g., when compiled and executed, to perform the functions described. The cameras 37, 38, and 39 are configured to capture images. In some implementations, the computer system includes a single camera 37 or two cameras 37 and 38 for capturing images.

Process of Position Determination Using Two Horizontal Angles

Figure 4:
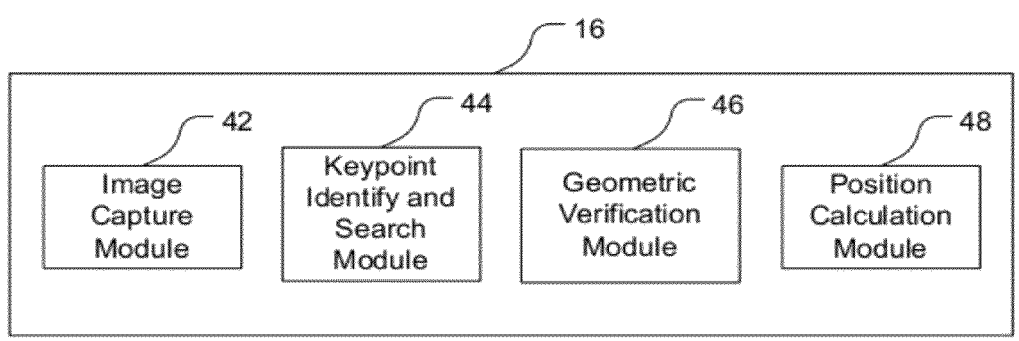
FIG. 4 is a block diagram of functional components of an access terminal shown in FIG. 1.
Figure 12:
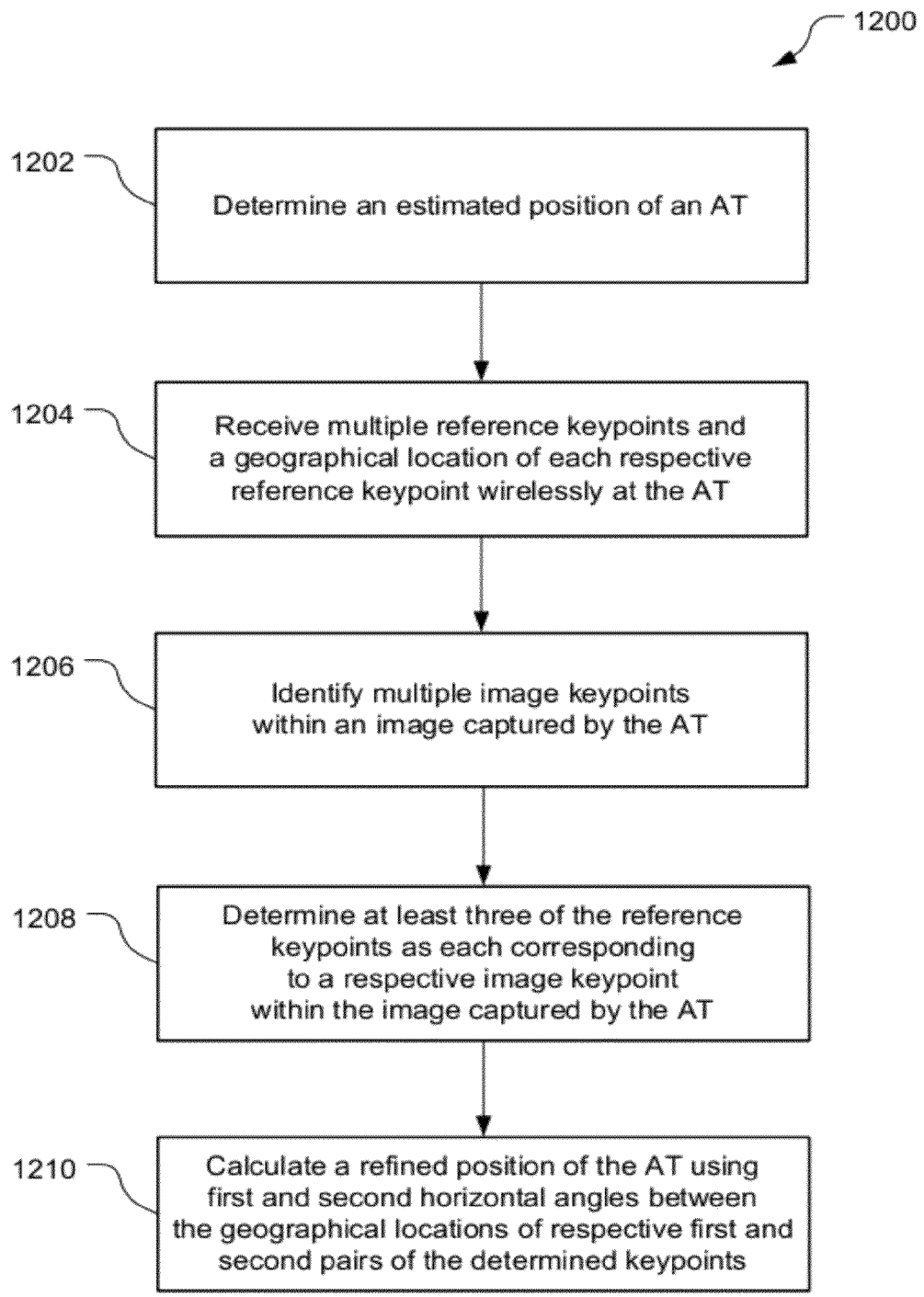
FIG. 12 is a block flow diagram of a process of determining position of an access terminal of a wireless communication system shown in FIG. 1.

Referring to FIG. 12, with further reference to FIGS. 1, 2, and 4, a process 1200 of determining position of an AT 16 of a wireless communication system 100 includes the stages shown. The process 1200 is, however, exemplary only and not limiting. The process 1200 can be altered, e.g., by having stages added, removed, or rearranged.

At stage 1202, a processor of the AT 16 determines an estimated position of the AT 16. Alternatively, the estimated position of the AT 16 is determined by a BTS 14, a satellite 22, or some other entity of the wireless communication system 100. The estimated position of the AT 16 is then transmitted to a transceiver of the AT 16.

At stage 1204, the transceiver of the AT 16 wirelessly receives multiple reference keypoints and a geographical location of each respective reference keypoint, where each geographical location is a location near the estimated position of the AT 16. The transceiver of the AT 16 wirelessly transmits the estimated position of the AT 16 as a request for the multiple reference keypoints and geographical locations. In some implementations, the AT 16 also wirelessly receives descriptors for the multiple reference keypoints. In other implementations, the AT 16 computes the descriptors for the received multiple reference keypoints.

In Computer Vision, a keypoint is a characteristic point in an image (e.g., a corner or the center of an object, a blob in the image and other), which for a given object can be recognized in images taken from different distances and perspectives. A small patch surrounding a keypoint in an image is referred to as a feature. By processing the feature, a descriptor (e.g., a digital signature or profile) can be obtained for the keypoint. There are many algorithms in Computer Vision to compute descriptors of keypoints in an image, including Scale-Invariant Feature Transform (SIFT) and Speeded Up Robust Features (SURF).

Referring to FIG. 4, the AT 16 includes an image capture module 42, a keypoint identify and search module 44, a geometric verification module 46, and a position calculation module 48. The image capture module 42 is configured to capture images, e.g., using the cameras 37, 38, and 39 of FIG. 3. A camera of the AT 16 can capture one or more images. Preferably, referring to FIGS. 8-11, multiple images are captured by multiple cameras (e.g., cameras 37, 38, and 39) arranged in a fan-like pattern on the AT 16. The image capture module 42 is further configured to combine multiple images into a composite image. For example, the image capture module 42 can create a composite image with an effective horizontal angle of view of at least 80° that is greater than the respective horizontal angles of view of the individual images from the cameras of the AT 16. The processor 30 of FIG. 3 can perform the function of combining images into a composite image.

At stage 1206 of FIG. 12, the processor of the AT 16 identifies multiple image keypoints within an image captured by the AT 16. Multiple image keypoints can be identified within the multiple images or within the composite image. The keypoint identify and search module 44 of FIG. 4 is configured to identify the multiple image keypoints from the captured images and to search for these identified image keypoints from the multiple received reference keypoints, e.g., from a list of multiple reference keypoints. The image keypoints can be identified as part of natural geographic objects (e.g., mountains, rocks, trees, hills) and man-made objects (e.g., buildings, statues, bridges, communication towers). Similarly, the reference keypoints may have been previously identified in reference images as part of natural geographic or man-made objects, referred to herein as reference objects. The reference keypoints are received, along with their known geographical positions (e.g., as latitude and longitude or geodetic coordinates), at the AT 16. For example, the reference keypoints can be received as physical descriptions of reference keypoints. The keypoint identify and search module 44 can perform the image keypoint identification or recognition function using techniques known in the art. Descriptors for the identified camera image keypoints can be computed, e.g., using SIFT or SURF.

The search function of the keypoint identify and search module 44 can include comparing a computed descriptor of an identified image keypoint in a captured image with the descriptors of the received reference keypoints to find one or more possible keypoint correspondences. A keypoint correspondence is a keypoint pair comprising one reference keypoint and one image keypoint, where the keypoints are matched by descriptor similarity (e.g., using similarity thresholds). In some implementations, the keypoint identify and search module 44 is, alternatively or additionally, configured to search the identified image keypoints for the received reference keypoints. Alternatively still, the BTS 14 or some other entity of the wireless communication system 100 determines the correspondence between reference keypoints and image keypoints, and information about the correspondence is transmitted to the transceiver of the AT 16.

The keypoint correspondences, found in the search function, alone cannot ensure that an object has been detected, because features in the image captured by the AT 16 may be similar to many features in more than one reference image. To make a determination that an object has been detected, there needs to be a threshold number of keypoint correspondences (e.g., at least 10 or 12) between image keypoints and reference keypoints of a reference object satisfying not only descriptor similarity but also geometric constraints. Assuming that a reference object is present in the image captured by the AT 16, it may be presumed that the image captured by the AT 16 and the respective reference image provide two perspectives of the same object. A mapping, called a homography, between these two perspectives can be attempted, where the mapping transforms the reference keypoints to the image captured by the AT 16. The reference keypoints' mapped locations in the image captured by the AT 16 are obtained by homography. If the mapped location of a reference keypoint from a keypoint correspondence is close to the location of the image keypoint from the same keypoint correspondence, a determination can be made that the keypoint correspondence passes geometric verification. If the number of keypoint correspondences passing geometric verification is greater than some threshold (e.g., 10 or 12), it can be said with high confidence that a reference object has been detected in the camera image. There are many algorithms to estimate homography using sophisticated optimization methods. As a result of the detection process, it may be determined that more than one reference object was detected in the camera image.

After geometric verification of detected objects, at stage 1208 of FIG. 12, the processor of the AT 16 selects at least three reference keypoints that passed the geometric verification. The selection of the reference keypoints from the keypoint correspondences determined as satisfying both descriptor similarity and geometric constraints is one technique for determining that the reference keypoints correspond to respective image keypoints within the image captured by the AT 16. The selected reference keypoints can belong to a single or multiple detected reference objects. In either case, the geographical locations of the selected reference keypoints need to be known. Further, the selected reference keypoints need to span sufficient angles from the point of view of the AT 16.

Figure 17:
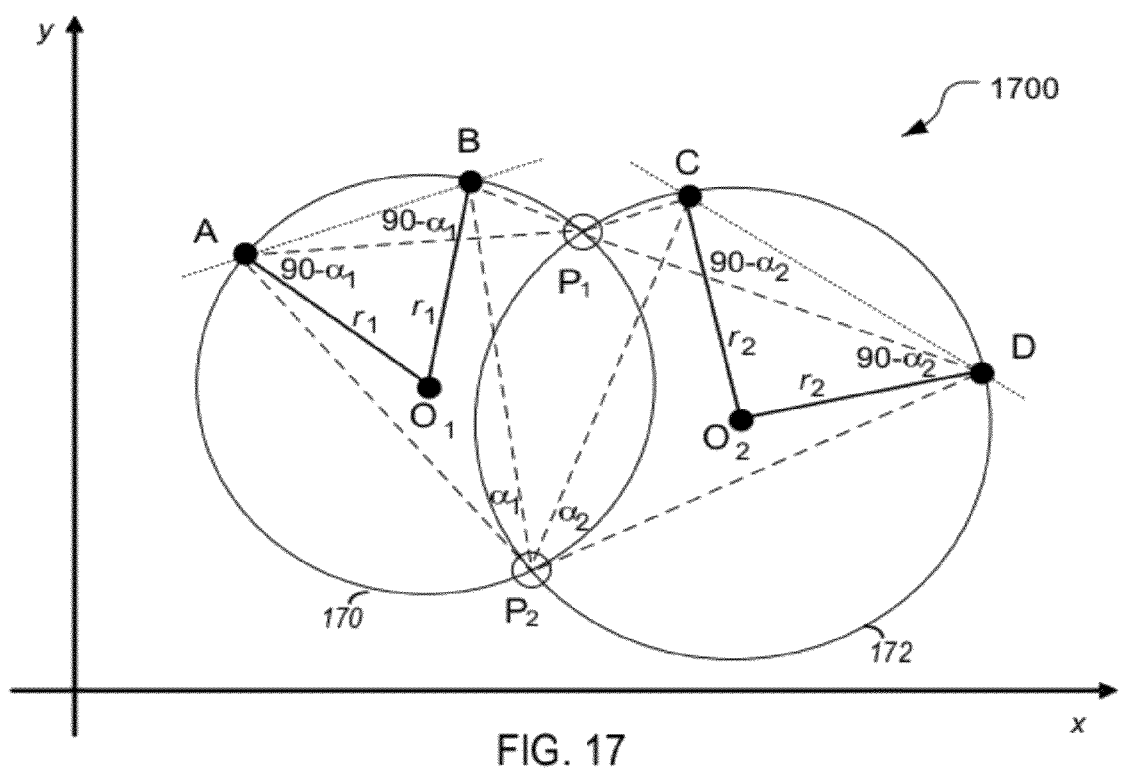
FIG. 17 is an illustration of position determination using two horizontal angles that are non-adjacent.

At stage 1210 of FIG. 12, the processor of the AT 16 calculates a refined position of the AT 16 that is more accurate than the estimated position (e.g., an estimated position received from the GPS satellite 22 of FIG. 2). The processor of the AT 16 calculates the refined position using first and second horizontal angles between the geographical locations of respective first and second pairs of the determined keypoints. The first and second pairs may have a common determined keypoint, as shown in the FIG. 5 where the first and second horizontal angles are adjacent. The refined position can also be calculated using first and second horizontal angles that are non-adjacent, as shown in FIG. 17 and described in further detail below. The position calculation module 48 of FIG. 4 is configured to calculate the refined position of the AT 16 based on the reference keypoints corresponding to the identified image keypoints determined by the geometric verification module 46.

Figure 5:
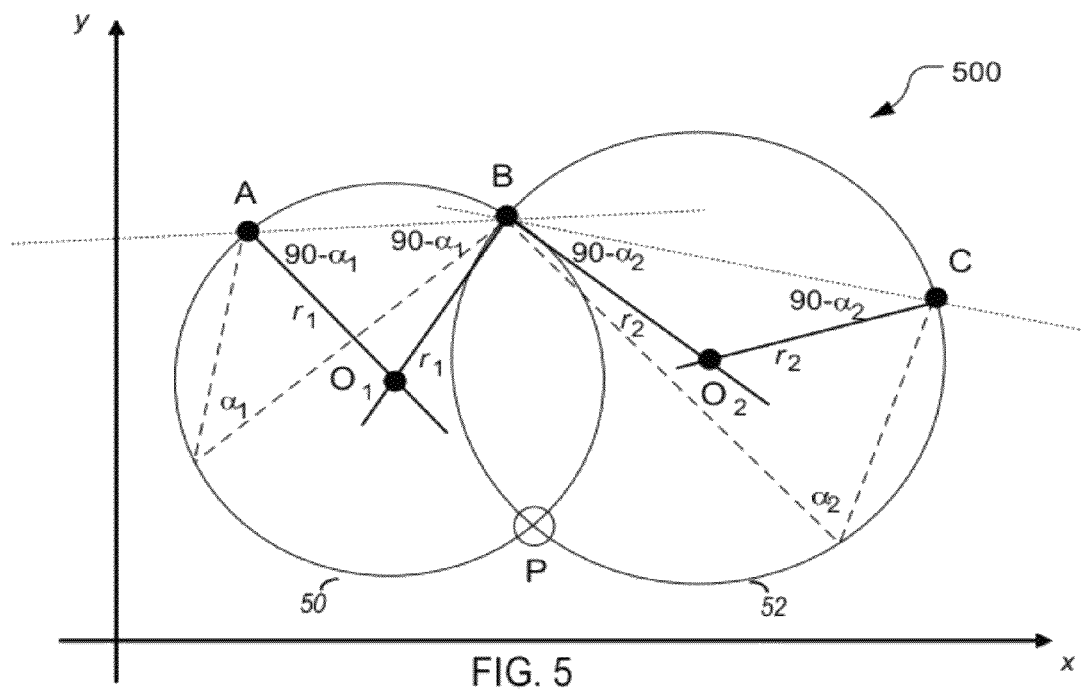
FIG. 5 is an illustration of position determination using two horizontal angles that are adjacent.
Figure 6:
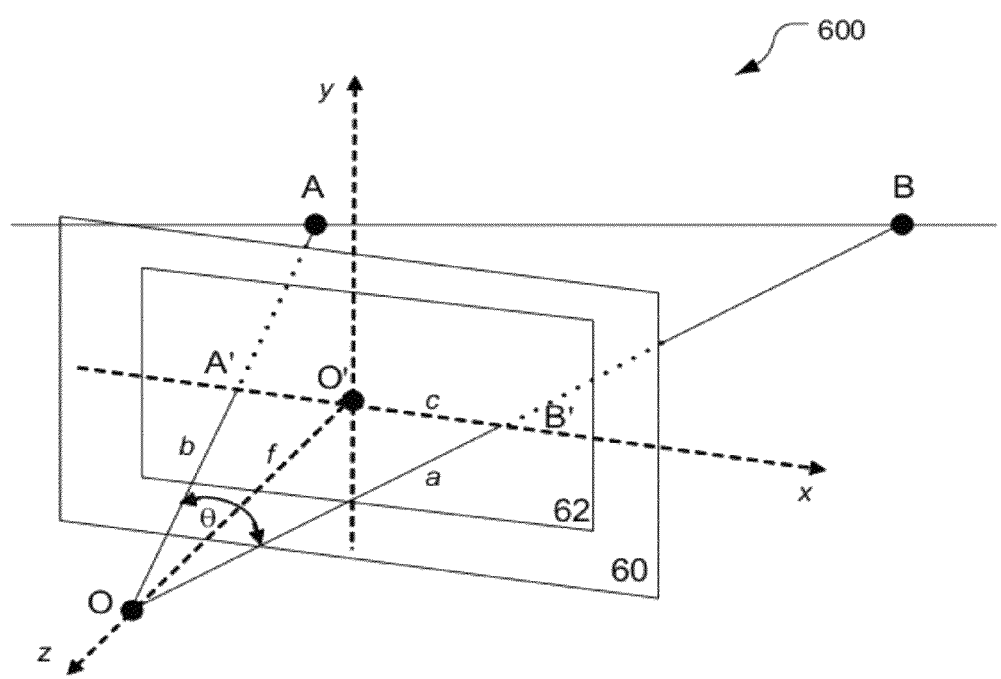
FIG. 6 is a perspective view of two points captured in an image by a camera.
Figure 7:
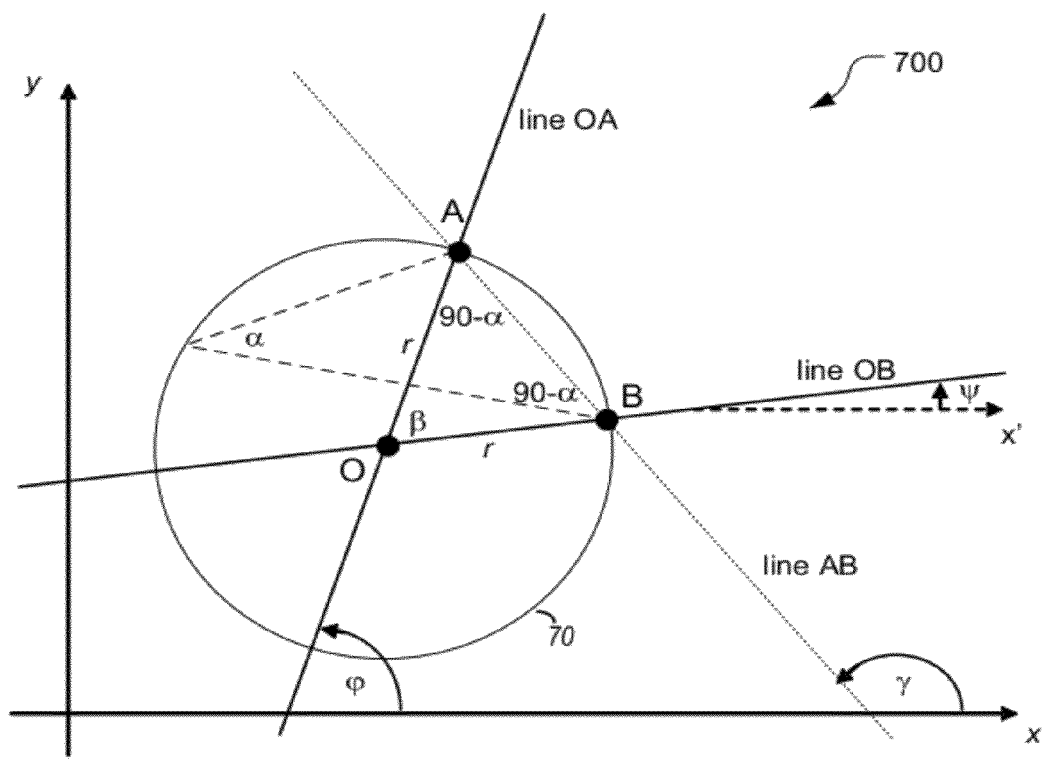
FIG. 7 is an illustration of calculation of a center and radius of a position circle defined by a horizontal angle.
Figure 14:
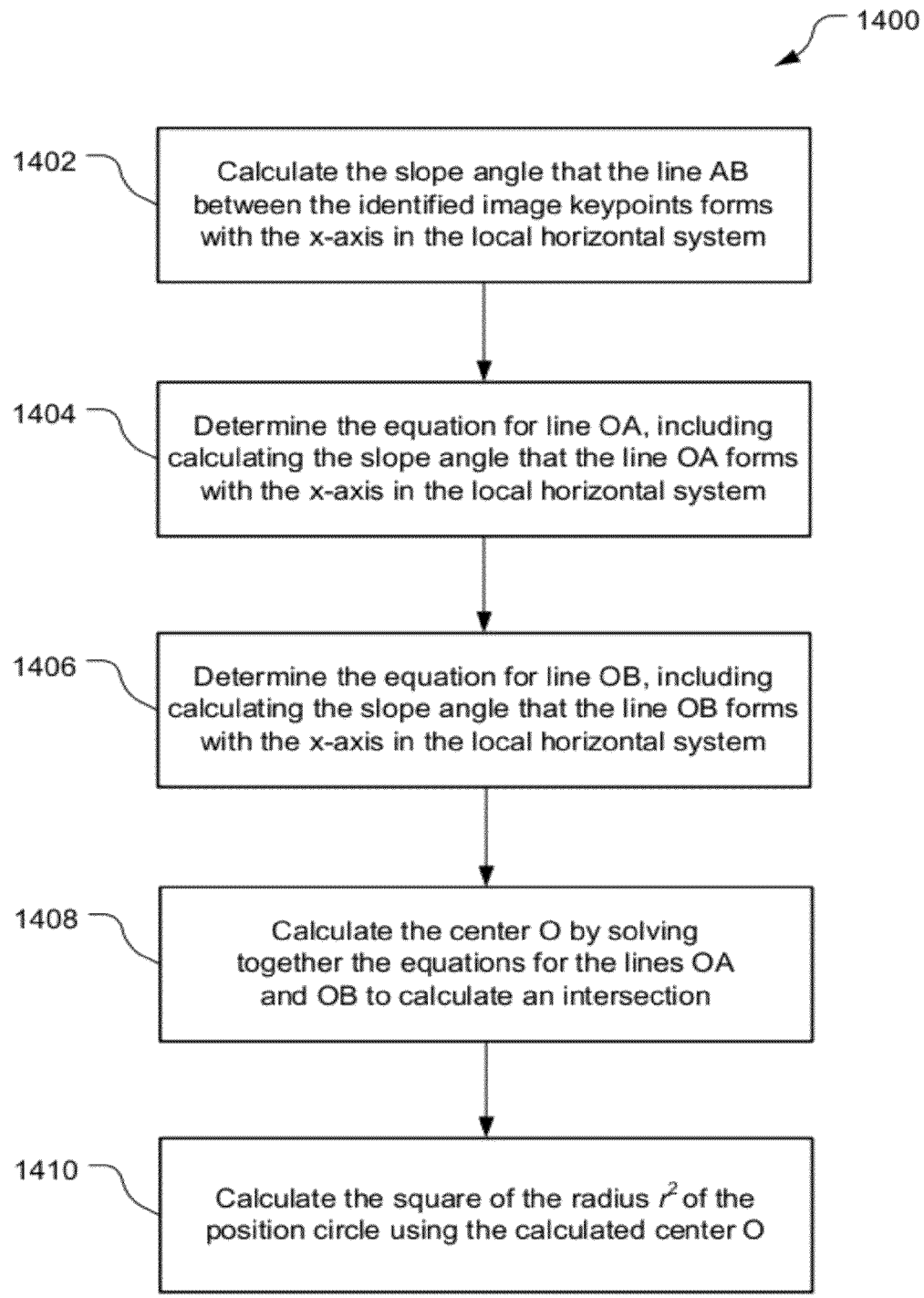
FIG. 14 is a block flow diagram of a process of calculating a center and a square of a radius of a position circle.
Figure 15:
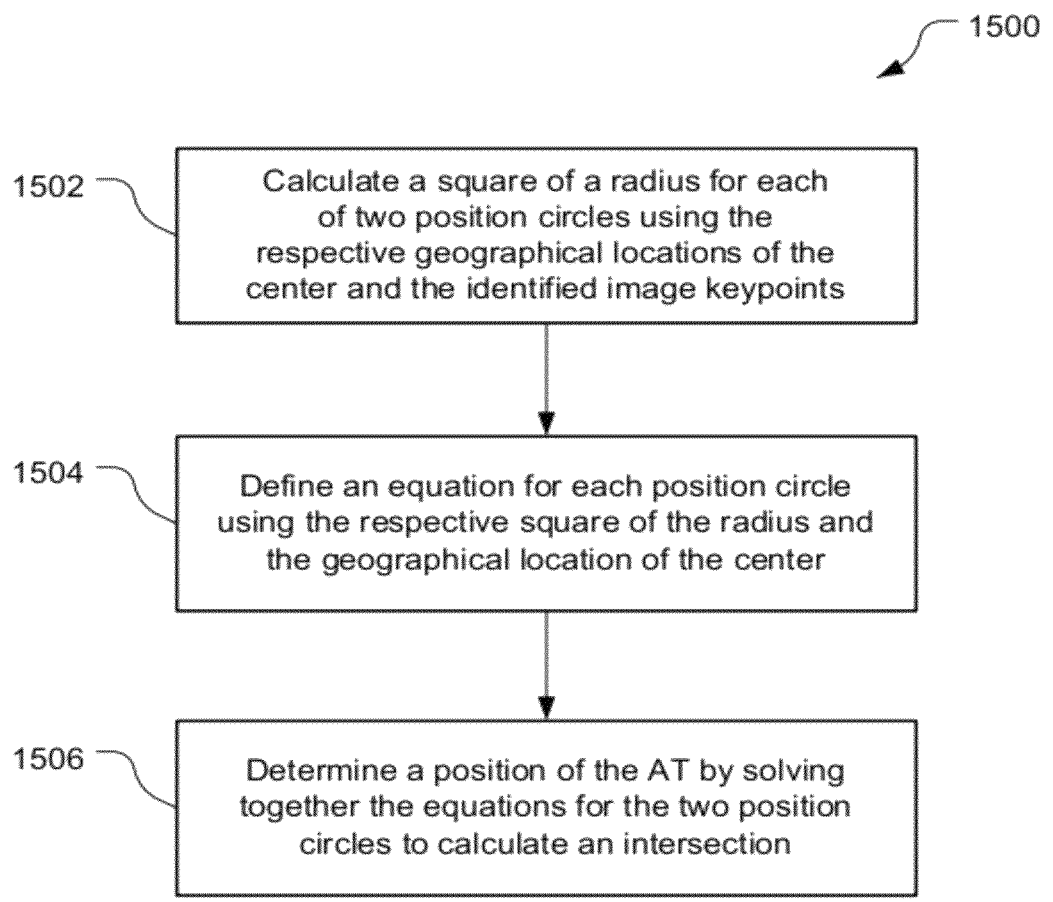
FIG. 15 is a block flow diagram of a process of determining a position of the access terminal shown in FIG. 1 by solving for an intersection of two position circles.

The refined position of the AT 16 at stage 1210 can be calculated in a number of stages, each of which can be performed by the position calculation module 48 of FIG. 4. First, a horizontal angle between identified image keypoints corresponding to a pair of determined keypoints is determined FIG. 13, described below with respect to FIG. 6, illustrates this process, which can be performed for the identified image keypoints corresponding to each of the first and second pairs of the determined keypoints. Second, a center and a square of a radius of a position circle are calculated using the known geographical locations of the determined keypoints and the determined horizontal angle between the corresponding identified image keypoints. FIG. 14, described below with respect to FIG. 7, illustrates this process, which can be performed for each of two position circles defined by the first and second horizontal angles, respectively. Third, a refined position of the AT 16 is determined by solving for the intersection of the two position circles, including defining equations for each of the two position circles using the calculated centers and radii. FIG. 15, described below with respect to FIG. 5, illustrates this process. The processor 30 of FIG. 3 can perform one or more functions of the position calculation module 48.

Preferably, the processor of the AT 16 selects the determined keypoints for each of the first and second pairs to provide the largest combined horizontal angle and so that each of the first and second horizontal angles is between 30° and 120°. Alternatively, the processor of the AT 16 selects the determined keypoints for each of the first and second pairs by selecting the determined keypoints that result in horizontal angles determined with the highest accuracy.

The transceiver of the AT 16 wirelessly also receives additional reference keypoints and an additional geographical location of each respective additional reference keypoint. Each additional geographical location is a location near an estimated future position of the AT 16. The processor of the AT 16 also tracks motion of the AT 16 to estimate the future position of the AT 16. Alternatively, the BTS 14, a satellite 22, or some other entity of the wireless communication system 100 tracks motion of the AT 16 to estimate the future position of the AT 16. The motion tracking can be performed using techniques known in the art.

The user of the AT 16 can choose to opt-in to position determination using horizontal angles, for example, by activating this functionality using menu options in a graphical user interface of the AT 16 display. If the user chooses not to opt-in to this method of position determination, other methods of position determination will be performed for the AT 16. In some implementations, if position determination using horizontal angles is activated on the AT 16, the processor of the AT 16 attempts to identify multiple image keypoints within each image captured by the AT 16. In some implementations, the processor of the AT 16 recognizes small changes in the location of identified image keypoints within successive images and estimates movement of the AT 16 based on those changes.

In some implementations, the BTS 14 or some other entity of the wireless communication system 100 determines the correspondence between reference keypoints and image keypoints, performs the calculations for determining a refined position of the AT 16, and transmits information about the refined position to the transceiver of the AT 16. For example, images captured by the AT 16 can be transmitted by the transceiver of the AT 16 to the BTS 14. The BTS 14 can then identify multiple image keypoints within the images to determine the correspondence between the identified image keypoints and known reference keypoints. Alternatively, the processor of the AT 16 can identify the image keypoints within the images, and the transceiver of the AT 16 can transmit the identified image keypoints (e.g., as physical descriptions of the image keypoints) to the BTS 14 to determine the correspondence between the identified image keypoints and known reference keypoints.

Position Determination Using Two Horizontal Angles

In navigation a position line or a line of position is defined as a set of points at which a given parameter has a constant value. Parameters used to construct position lines include bearings, distances to objects, angles between objects, altitudes of celestial bodies, etc. In order to determine position, an intersection of at least two position lines is needed, where the intersection is presumed to be the observer's position.

Referring to FIG. 5, the position P of an observer (e.g., an AT 16 of FIG. 1) can be determined using two horizontal angles $\alpha_1$ and $\alpha_2$, between objects A, B, and objects B, C, with corresponding position circles 50 and 52. In the example of FIG. 5, the two horizontal angles $\alpha_1$ and $\alpha_2$ are adjacent, although this is not necessary for position determination, as described below in reference to FIG. 17. A position circle is the set of points at which a line segment joining two objects is seen at a constant angle (i.e., the horizontal angle). In FIG. 5, the position circle 50 is the position line based on the horizontal angle $\alpha_1$ between objects A and B. From planar geometry, it is known that all angles inscribed in the circle 50 subtended on the cord between objects A and B are equal (angle $\alpha_1$). The position circle 52 is the position line based on the horizontal angle $\alpha_2$ between objects B and C and has the same property that all inscribed angles subtended on the cord BC are equal (angle $\alpha_2$). The two position circles 50 and 52 intersect at two points, the observer's position P and the position of object B, i.e., the object common to both horizontal angles $\alpha_1$ and $\alpha_2$. FIG. 5 illustrates inscribed angles subtended on a cord having vertices on bigger arcs of both position circles 50 and 52. Such angles are less than or equal to 90°. The angles subtended on the same cord having vertices on smaller arcs are greater than or equal to 90° and may be used equally well in the method described herein.

For determination of a position P of an AT 16 in a wireless communication system 100 of FIG. 1, the objects A, B, and C in FIG. 5 represent geographical locations of reference keypoints belonging to one or more reference objects detected in an image captured by the cameras 37, 38, and 39.

The horizontal angle $\alpha_1$ between a first pair of the identified image keypoints (i.e., objects A and B in FIG. 5) and the horizontal angle $\alpha_2$ between a second pair of the identified image keypoints (i.e., objects B and C in FIG. 5) can be measured/determined directly from the one or more images captured by the cameras 37, 38, and 39. The first pair and the second pair share one and only one identified image keypoint, here as object B, to which one of the determined keypoints corresponds.

Determination of Horizontal Angle Between Identified Image Keypoints

Figure 13:
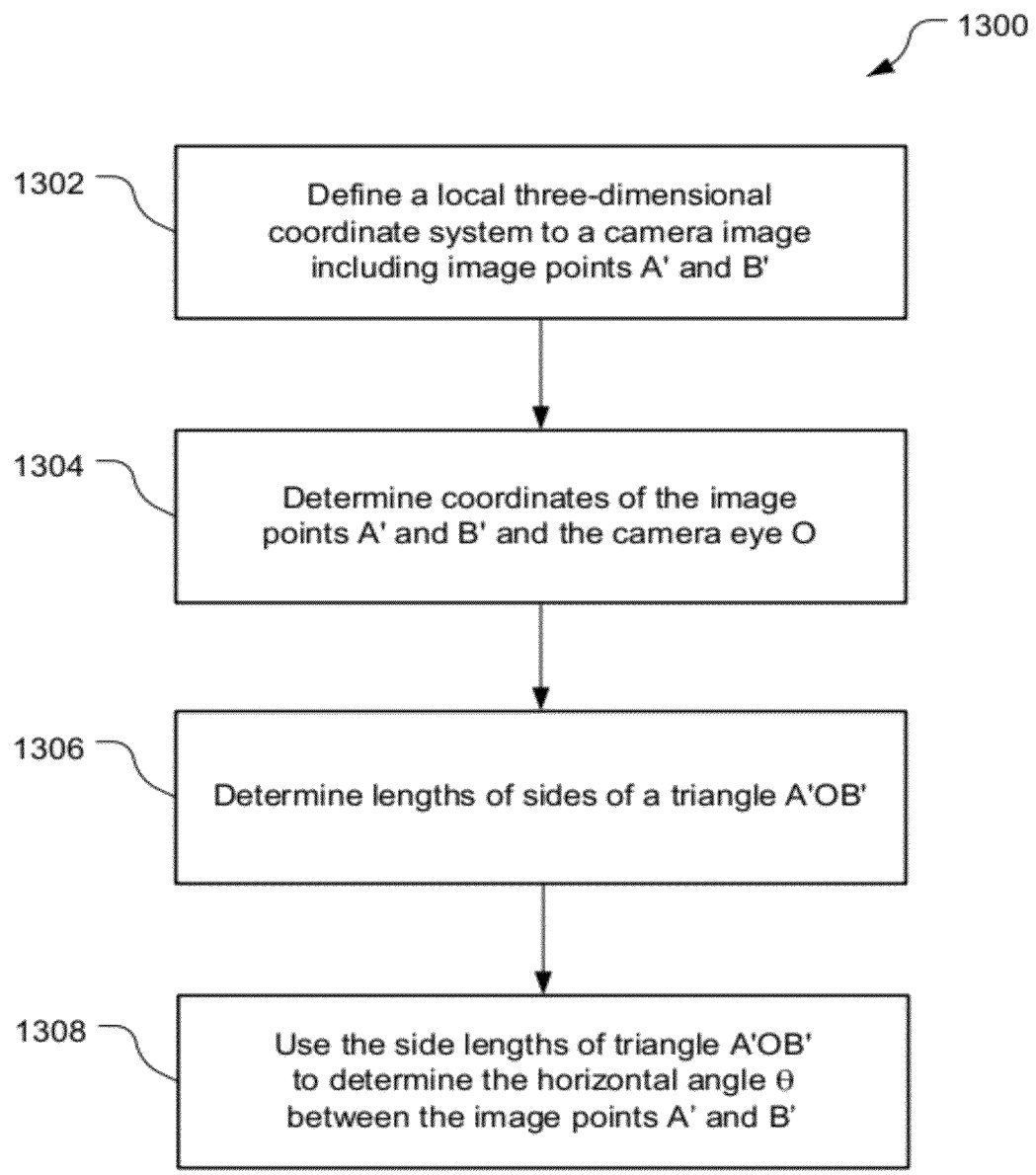
FIG. 13 is a block flow diagram of a process of determining a horizontal angle between identified image keypoints.

Referring to FIG. 6, with further reference to FIGS. 5 and 13, a perspective view is shown of two points, A and B, representing keypoints of detected objects within an image captured by the camera 37. For ease of reference, the descriptions of FIGS. 6 and 13 refer to camera 37 of FIG. 3, although the descriptions apply to any of cameras 37, 38, and 39 of FIG. 3. Point O represents the observer's position corresponding to the eye of the camera 37. The projective plane 60 of the camera 37 is located at a focal distance f from the camera eye O. An image 62 is created on projective plane 60. Images A' and B' of points A and B are image points at which the rays OA and OB pierce the projective plane 60. The horizontal angle θ (i.e., angle AOB) is the angle at which points A and B are seen from the observer's position O, where the camera eye is located. Angle AOB is equal to angle A'OB', such that knowledge of the location of points A' and B' on the camera image 62 is sufficient to determine the angle θ.

Referring to FIG. 13, with further reference to FIG. 6, a process 1300 of determining a horizontal angle between identified image keypoints corresponding to a pair of determined keypoints includes the stages shown. The process 1300 is, however, exemplary only and not limiting. The process 1300 can be altered, e.g., by having stages added, removed, or rearranged.

At stage 1302, a processor of the AT 16 defines a local three-dimensional coordinate system to a camera image 62 including image points A' and B', which are projections of points A and B onto the projective plane 60. In FIG. 6, a local three-dimensional Cartesian system is attached to the camera image 62. The origin of the coordinate system is point O', the projection of the camera eye O onto the projective plane 60 along a line perpendicular to the projective plane 60. This point is called the principal point of the projection and has coordinates (0, 0, 0) in this coordinate system. The x-axis is directed to the right of the camera image 62, the y-axis is directed upwards, and the z-axis is perpendicular to the projective plane 60 and points toward the camera eye O.

At stage 1304, a processor of the AT 16 determines coordinates of the image points A' and B' and the camera eye O in the local three-dimensional coordinate system. For digital cameras, a convenient unit of length is a pixel, and the coordinates of all points on the image 62 can be measured and expressed in pixels. For example, the processor 30 of the AT 16 can determine the location of the two points, A' and B', on the image 62 and use the known resolution in pixels of the image 62 to calculate the image coordinates in pixels of points A' and B'. The focal distance f of the camera 37 is also measured in pixels, the value of which is determined during calibration of the camera 37.

If point A' has image coordinates of $(x_{A'}, y_{A'})$, the coordinates of A' in the local three-dimensional coordinate system are $(x_{A'}, y_{A'}, 0)$, because point A' lies in the projective plane 60, which has a z coordinate of zero. Similarly, image coordinates of point B', $(x_{B'}, y_{B'})$, have coordinates of $(x_{B'}, y_{B'}, 0)$ in the local three-dimensional coordinate system. Point O, which lies on the z-axis, has coordinates (0, 0, f).

At stage 1306, a processor of the AT 16 determines lengths of sides of a triangle A'OB' formed by the camera eye O and the image points A' and B'. With the coordinates of A', B', and O, the length of the sides of triangle A'OB' can be determined. For a=length (OB'), b=length (OA'), and c=length (A'B'), the equations for the lengths are:

$$a = \sqrt{(x_{B'}-x_O)^2+(y_{B'}-y_O)^2+(z_{B'}-z_O)^2} \text{ simplified to } a= \sqrt{(x_{B'})^2+(y_{B'})^2+(f)^2} \quad (1)$$

$$b = \sqrt{(x_{A'}-x_O)^2+(y_{A'}-y_O)^2+(z_{A'}-z_O)^2} \text{ simplified to } b= \sqrt{(x_{A'})^2+(y_{A'})^2+(f)^2} \quad (2)$$

$$c = \sqrt{(x_{A'}-x_{B'})^2+(y_{A'}-y_{B'})^2+(z_{A'}-z_{B'})^2} \text{ simplified to } c= \sqrt{(x_{A'}-x_{B'})^2+(y_{A'}-y_{B'})^2} \quad (3)$$

after substitution of the point coordinates.

At stage 1308, a processor of the AT 16 uses the side lengths of triangle A'OB' to determine the horizontal angle θ between the image points A' and B', the projections of points A and B representing the identified image keypoints. The horizontal angle θ is equal to the horizontal angle between the identified image keypoints, which correspond to the pair of determined keypoints. From planar trigonometry, the law of cosines provides the equation for the angle θ:

$$\theta = \arccos\left[\frac{a^2+b^2-c^2}{2ab}\right]. \quad (4)$$

Thus, to determine the horizontal angle $\alpha_1$ of FIG. 5 between a first pair of the identified image keypoints (i.e., corresponding to objects A and B), solutions for the equations (1) through (4) can be calculated using the determined three-dimensional coordinates of the image points A' and B' and the camera eye O. Similarly, to determine the horizontal angle $\alpha_2$ of FIG. 5 between a second pair of the identified image keypoints (i.e., corresponding to objects B and C), the three-dimensional coordinates of image points B' and C' and a camera eye O can be determined and used as the coordinates in equations (1) through (4).

The three-dimensional coordinates of the image point B' and the camera eye O used in determining horizontal angle $\alpha_2$ can differ from the three-dimensional coordinates used in determining horizontal angle $\alpha_1$ if the image keypoints corresponding to objects A and C in FIG. 5 are identified in different images captured by the AT 16. For example, if camera 37 captures a first image with identified image keypoints corresponding to objects A and B and camera 38 captures a second image with identified image keypoints corresponding to objects B and C, each image would have a different perspective view of object B as seen from the observer's position O, where the eye of each respective camera is located. Differences in the focal length f of cameras 37 and 38 would lead to different three-dimensional coordinates for point O for each camera.

Referring again to FIG. 5, The center $O_1$ of the position circle 50 is the crossing point of two lines drawn at an angle $90°-\alpha_1$ to the line segment AB. Similarly, the center $O_2$ of the position circle 52 is the crossing point of two lines drawn at an angle $90°-\alpha_2$ to the line segment BC. The radii are $r_1$, line segment $O_1A$, and $r_2$, line segment $O_2B$, for the position circles 50 and 52, respectively.

Figure 16:
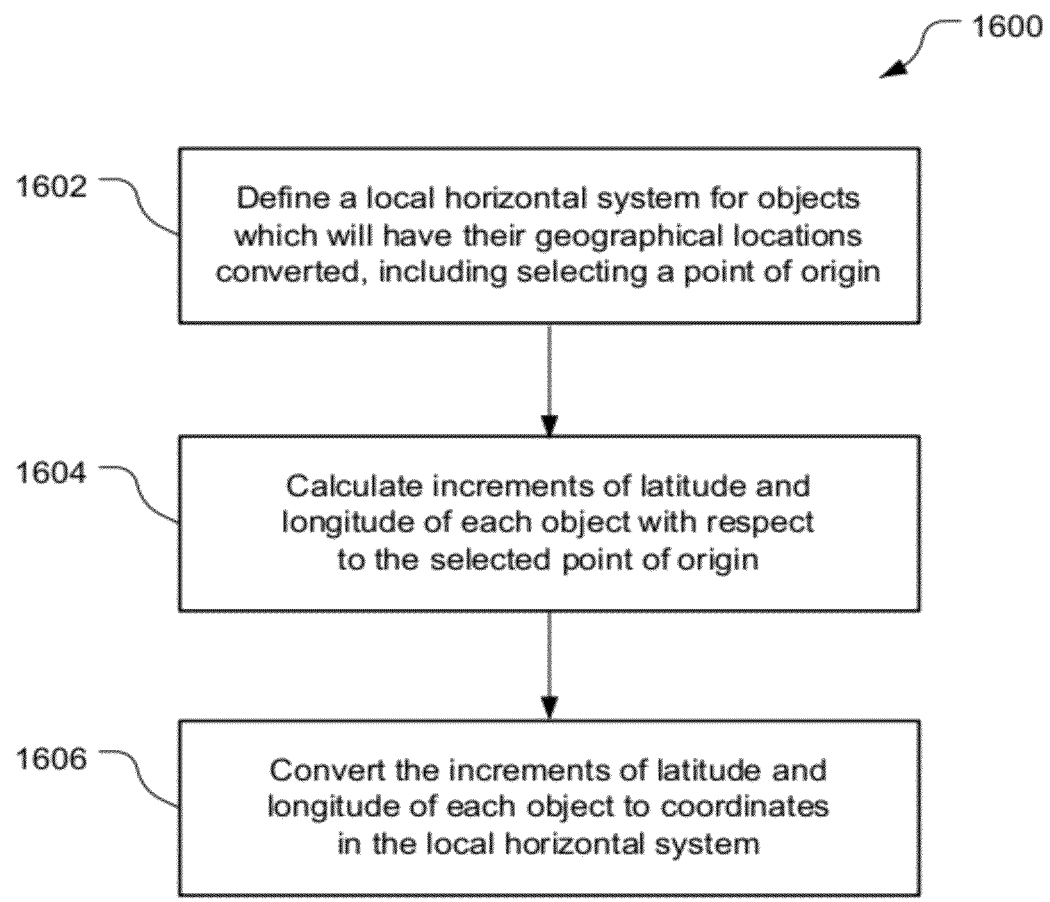
FIG. 16 is a block flow diagram of a process of converting geographical latitude and longitude into coordinates of a local horizontal system.

Calculation of the center of a position circle is described below in reference to FIGS. 7 and 14, which illustrate calculation of the center using the known geographical locations of the determined keypoints and the horizontal angle between the corresponding identified image keypoints determined using process 1300 of FIG. 13. The geographical locations of the determined keypoints can be expressed using geographical latitude and longitude and are used as the geographical locations of the corresponding identified image keypoints (that is, the geographical locations of the objects A, B, and C of FIG. 5). Geographical coordinate system using latitude and longitude is spherical and not Cartesian. For small areas on the Earth's surface, a local horizontal coordinate system that is Cartesian can be introduced, simplifying calculations. FIG. 16, described below, illustrates the process 1600 for constructing local horizontal coordinate system.

Referring to FIG. 15, with further reference to FIG. 5, a process 1500 of determining a position of the AT 16 by solving for an intersection of two position circles includes the stages shown. The process 1500 is, however, exemplary only and not limiting. The process 1500 can be altered, e.g., by having stages added, removed, or rearranged.

At stage 1502, a processor of the AT 16 calculates the square of the radius for each of the two position circles. The calculation uses the known geographical locations of the determined keypoints as the geographical locations of the corresponding identified image keypoints. For the position circles 50 and 52 of FIG. 5, using the geographical locations $(x_{O_1}, y_{O_1})$ and $(x_{O_2}, y_{O_2})$ of the centers, $O_1$ and $O_2$, and the geographical locations $(x_A, y_A)$, $(x_B, y_B)$, and $(x_C, y_C)$ of the three objects, A, B, and C, (i.e., corresponding to the identified image keypoints), the squares of the radii $r_1^2$ and $r_2^2$ can be calculated as:

$$r_1^2 = (x_A - x_{O_1})^2 + (y_A - y_{O_1})^2 \tag{5}$$

$$r_2^2 = (x_B - x_{O_2})^2 + (y_B - y_{O_2})^2 \tag{6}$$

for the position circles 50 and 52, respectively. The geographical locations used in these calculations are x and y coordinates in the local horizontal Cartesian system, e.g., as converted from geographical latitude and longitude using process 1600 of FIG. 16.

At stage 1504, a processor of the AT 16 defines an equation for each position circle using the respective square of the radius and the geographical location of the center. The equations are:

$$(x_{O_1} - x)^2 + (y_{O_1} - y)^2 = r_1^2 \tag{7}$$

$$(x_{O_2} - x)^2 + (y_{O_2} - y)^2 = r_2^2 \tag{8}$$

for the position circles 50 and 52, respectively, of FIG. 5.

At stage 1506, a processor of the AT 16 determines the position (e.g., a refined position) of the AT 16 by solving together the equations for the two position circles to calculate an intersection. Solving equations (7) and (8) together for the x and y values produces two intersection points: the geographical location $(x_B, y_B)$ of object B and the position of the AT 16 at point P. Point P is the position from which the segment AB is seen at horizontal angle $\alpha_1$ and the segment BC is seen at horizontal angle $\alpha_2$. For this technique of position determination, the objects A, B, and C and the position P cannot all lie on the same circle.

Conversion of Geographical Locations into Coordinates of a Local Horizontal System As described above, the AT 16 of FIG. 1 receives multiple reference keypoints (e.g., as physical descriptions of multiple reference keypoints) and a geographical location of each respective reference keypoint. Preferably, each geographical location is a location near an estimated position of the AT 16. The position of the AT 16 can be estimated, for example, using GPS, A-GPS, or a cell-based positioning method.

The wireless communication system 100 of FIG. 1 stores the reference keypoints and geographical locations for a coverage area in a relational database or other information repository. The reference keypoints and their geographical locations, and optionally the descriptors of the reference keypoints, can be accumulated in, stored in, indexed in, and retrieved from the database or repository. Multiple reference keypoints and their respective geographical locations can be retrieved and transmitted to the AT 16, for example, in response to a request by the AT 16 for reference keypoints with geographical locations near an estimated position of the AT 16. The request from the AT 16 preferably includes the estimated position. A server or another component of the BTS 14, or a different entity (not shown) of the wireless communication system 100, can respond to the request from the AT 16 by retrieving and transmitted the requested reference keypoints and geographical locations, and optionally, the descriptors for the reference keypoints. In some implementations, without receiving requests for reference keypoints, the BTS 14 transmits to ATs 16 in its coverage area, on a regular or an irregular schedule, reference keypoints and their geographical locations, where reference keypoints sent to a particular AT 16 have geographical locations near the estimated position of that AT 16.

The geographical locations of the reference keypoints received by the AT 16 can be given as geographical latitude and longitude. The geographical location of a reference keypoint determined as corresponding to an identified image keypoint can be used as the geographical location of the corresponding identified image keypoint. Geographical latitude and longitude are converted to coordinates of the local horizontal Cartesian system.

Referring to FIG. 16, with further reference to FIG. 5, a process 1600 of converting geographical latitude and longitude into coordinates of a local horizontal system includes the stages shown. The process 1600 is, however, exemplary only and not limiting. The process 1600 can be altered, e.g., by having stages added, removed, or rearranged.

At stage 1602, a processor of the AT 16 defines a local horizontal system for the objects (e.g., keypoints or features) which will have their geographical locations converted. Defining the local horizontal system includes selecting a point of origin for the system. The planar Cartesian system is defined by its point of origin and orthogonal axes x and y. For navigation purposes, any point $P_0$ on the Earth's surface in the area of interest can be selected as the point of origin and used to define the horizon plane of the local horizontal system. $P_0$ can be selected, for example, as the estimated position of the AT 16 or as the geographical location of a received reference keypoint. In the local horizontal system, it is convenient to define the x-axis as pointing East and the y-axis as pointing North.

For objects A, B, and C (e.g., corresponding to the identified image keypoints corresponding to the determined keypoints defining the two horizontal angles), the coordinates of the geographical locations are $(lat_A, long_A)$, $(lat_B, long_B)$, and $(lat_C, long_C)$. The selected point of origin has geographical location coordinates of $(lat_{P_0}, long_{P_0})$. As in FIG. 5, the horizontal angle between objects A and B is $\alpha_1$, and the horizontal angle between objects B and C is $\alpha_2$.

At stage 1604, a processor of the AT 16 calculates the increments of latitude and longitude of each object with respect to the selected point of origin. With the local horizontal system defined, the coordinates of objects A, B, and C in the horizontal plane can be expressed with respect to their axes. The increments of latitude and longitude of object A are:

$$\Delta lat_A = lat_A - lat_{P_0} \quad \Delta long_A = long_A - long_{P_0} \qquad (9)$$

calculated with respect to the origin point $P_0$. Equivalent equations can be written for points B and C to calculate $\Delta lat_B$, $\Delta long_B$, $\Delta lat_C$, and $\Delta long_C$.

At stage 1606, a processor of the AT 16 converts the increments of latitude and longitude of each object to coordinates in the local horizontal system. The increments of latitude and longitude are converted into a desired unit of length. For example, increments in degrees of latitude and longitude can be converted into meters. There are 60 minutes of arc in a degree. A nautical mile is defined as one minute of arc of latitude of a meridian. One nautical mile is equal to 1852 meters. For increments of latitude in degrees, the difference in degrees is multiplied by 60 minutes of arc per degree to give the difference in nautical miles. The difference in nautical miles of latitude is then multiplied by 1852 meters per nautical mile. The equation to convert increments of latitude in degrees $\Delta lat_A$ to a y coordinate in meters is:

$$y_A = \Delta lat_A \times 60 \times 1852 \qquad (10)$$

with equivalent equations for points B and C for calculating $y_B$ and $y_C$, respectively.

For increments of longitude in degrees, the difference in degrees is also multiplied by 60 minutes of arc per degree and 1852 meters per nautical mile. However, increments of longitude are additionally multiplied by the cosine of mean latitude of the location. This additional multiplication factor is used because circles of parallels of longitude are not great circles of the Earth's sphere, and their radii are proportional to cosine of the latitude of the location. The equation to convert increments of longitude in degrees $\Delta long_A$ to an x coordinate in meters is:

$$x_A = \Delta long_A \times 60 \times 1852 \times \cos(lat_{mean}) \qquad (11)$$

with equivalent equations for points B and C for calculating $x_B$ and $x_C$, respectively. In practice, the mean latitude between points A and $P_0$ are not generally calculated, and the cosine of latitude of point $P_0$ is used in equation (11), because all points of interest are in the range of only a few hundred meters. The difference in cosine of latitude in this range is negligible. Accordingly, the mean latitude can be approximated as the latitude of any point in the area, e.g., the origin point $P_0$.

Applying equations (10) and (11) for point A and equivalent equations for points B and C produces x, y coordinates in meters in the local horizontal system for objects A, B, and C: $(x_A, y_A)$, $(x_B, y_B)$, and $(x_C, y_C)$. These coordinates are used in the calculations of equations (5) and (6) in reference to FIGS. 5 and 15 and used in the calculations of equations (13), (16), (19), and (21) through (24) in reference to FIGS. 7 and 14.

Calculation of a Center of a Position Circle

Referring to FIG. 7, an equation for a single position circle 70 defined by a horizontal angle α between objects A and B can be defined by a center point O and the radius r. The following calculations can be performed for each of the two position circles 50 and 52 of FIG. 5 to define equations (7) and (8) for the two position circles 50 and 52, respectively. The position of the AT 16 at point P of FIG. 5 can then be calculated by solving together equations (7) and (8) for the intersection.

The set of points from which the line segment AB is seen at constant angle (i.e., horizontal angle α) is the position circle 70 with the line segment AB being the circle's chord. For determination of a position P of an AT 16 in a wireless communication system 100 of FIG. 1, the objects A and B are detected objects that correspond to two image keypoints identified in one or more images captured by the AT 16 (e.g., the cameras 37, 38, and 39 of FIG. 3). For each of the two identified image keypoints, a received reference keypoint is determined as corresponding to the identified image keypoint, as described above. The geographical location of the determined keypoint is used as the geographical location of the corresponding identified image keypoint (that is, the geographical location of the respective object A or B). As described above, a local horizontal system can be defined, and the geographical locations can be converted from degrees in latitude and longitude to x, y coordinates in meters for use in the following calculations for the position circle center.

The horizontal angle α between the identified image keypoints (i.e., corresponding to objects A and B) can be measured directly from the images captured by the cameras 37, 38, and 39, as described above in reference to FIGS. 6 and 13. Measuring the horizontal angle α provides its magnitude only. The horizontal angle α can be presumed to be positive and can be added or subtracted, as described below.

When viewed from the perspective of the center O, the object A is to the left of object B for position circle 70. If the identified image keypoint corresponding to object A is to the left of the identified image keypoint corresponding to object B from the perspective of the AT 16, this is the correct position circle to define. A second position circle (not shown), which should not be used for this position determination, can also be defined where the line segment AB is also seen at constant horizontal angle α. This second position circle would be symmetric to the position circle 70 with respect to line segment AB. That is, the second position circle would be on the other side of the line segment AB. However, when viewed from the center of this second symmetric position circle, the object B would be to the left of object A. Determining the correct center and radius of the position circle 70 from which the line segment AB is seen at constant horizontal angle α involves careful application of sign rules in order to solve ambiguities about the circle's center and the respective position circle.

In analytical geometry, the slope of a line is defined as the tangent of an angle at which the line crosses the x-axis. In right-handed Cartesian systems, slope angles of lines are measured from the positive direction of the x-axis in a counter-clockwise direction and take values from 0° to 180°. Such angles are considered positive. In FIG. 7, angles γ, φ, and ψ are slope angles of lines AB, OA, and OB, respectively, and the arcs show their positive directions.

To define an equation for the position circle 70, the center O and the radius r are calculated. The center O of the position circle 70 is the crossing point of line OA and line OB. The radius r is the line segment OA for the position circle 70. Because the lines OA and OB pass through objects A and B with known coordinates, the equations for the lines can be defined after calculating their slopes.

Triangle OAB in FIG. 7 is an isosceles triangle, because its sides OA and OB, being radii r of the circle, are equal. Accordingly, the angles OAB and OBA are also equal. From plane geometry, the value of an inscribed angle (i.e., horizontal angle α) subtended on chord AB is equal to half of the central angle (i.e., central angle AOB=β in FIG. 7) subtended on the same chord AB. That is, α=β/2. In each triangle, all the internal angles sum up to 180°. Based on these characteristics of triangle OAB, an equation for the angles OAB and OBA between the radii r and the line segment AB can be written as:

$$\angle OAB = \angle OBA = (180° - \beta)/2 = 90° - \alpha \quad (12)$$

as shown in FIG. 7. Line OA and line OB are sloped at angles 90°-α to the line segment AB.

Referring to FIG. 14, with further reference to FIG. 7, a process 1400 of calculating a center and a square of a radius of a position circle includes the stages shown. The calculation uses the horizontal angle between identified image keypoints and the known geographical locations of keypoints determined as corresponding to the identified image keypoints. The process 1400 can be performed for each of position circles 50 and 52 defined by the horizontal angles $\alpha_1$ and $\alpha_2$, respectively, in FIG. 5. The process 1400 is, however, exemplary only and not limiting. The process 1400 can be altered, e.g., by having stages added, removed, or rearranged.

At stage 1402, a processor of AT 16 calculates the slope angle that the line AB between objects A and B, corresponding to the identified image keypoints, forms with the x-axis in the local horizontal system. The local horizontal system is the system defined by the selected origin point $P_O$ used in the conversion of the geographical locations of the identified image keypoints. The equation for the slope $m_{AB}$ of the line AB is:

$$m_{AB} = (y_B - y_A)/(x_B - x_A) \quad (13)$$

and the equation for the angle γ is:

$$\gamma = \arctan(m_{AB}) \quad (14)$$

which is the slope angle that line AB forms with the x-axis. In right-handed Cartesian systems, slope angles of lines take values from 0° to 180°. If any of the calculated slope angles γ, φ, or ψ is negative, the angle can be converted to a positive value between 0° and 180° by adding 180°. If any of the calculated slope angles γ, φ, or ψ is greater than 180°, the angle can be converted to a positive value between 0° and 180° by subtracting 180°.

At stage 1404, a processor of AT 16 determines the equation for line OA between the center O and the object A, including calculating the slope angle that the line OA forms with the x-axis in the local horizontal system. The angle φ of the line OA with respect to the x-axis is the algebraic sum of angle γ and the angle 90°-α between segment AB and the line OA. In the frame of reference of FIG. 7, the line OA can be treated as a rotation of line AB about object A by angle 90°-α. Because object B is to the right of object A, the rotation is clockwise and is negative in the right-handed Cartesian system. Accordingly, the equation for angle φ is:

$$\phi = \gamma - (90° - \alpha) \quad (15)$$

which is the slope angle that line OA forms with the x-axis. The calculated slope angle φ may be corrected (i.e., ±180°) to ensure that it is a positive value between 0° and 180°.

With the x, y coordinates for object A and the slope angle φ calculated, the equation for line OA can be determined as:

$$y = m_{OA} * (x - x_A) + y_A \quad (16)$$

where the slope $m_{OA}$ is the tangent of the slope angle φ of line OA:

$$m_{OA} = \tan(\phi) \quad (17)$$

and $(x_A, y_A)$ are the coordinates of object A, e.g., coordinates in meters converted from latitudinal and longitudinal coordinates in degrees.

At stage 1406, a processor of AT 16 determines the equation for line OB between the center O and the object B, including calculating the slope angle that the line OB forms with the x-axis in the local horizontal system. The angle ψ of the line OB with respect to the x-axis is the algebraic sum of angle γ and the angle 90°-α between segment AB and the line OB. In the frame of reference of FIG. 7, the line OB can be treated as a rotation of line AB about object B by angle 90°-α. Because object A is to the left of object B, the rotation is counter-clockwise and is positive in the right-handed Cartesian system. Accordingly, the equation for angle ψ is:

$$\psi = \gamma + (90° - \alpha) \quad (18)$$

which is the slope angle that line OB forms with the x-axis. The calculated slope angle ψ may be corrected (i.e., ±180°) to ensure that it is a positive value between 0° and 180°.

With the x, y coordinates for object B and the slope angle ψ calculated, the equation for line OB can be determined as:

$$y = m_{OB} * (x - x_B) + y_B \quad (19)$$

where the slope $m_{OB}$ is the tangent of the slope angle ψ of line OB:

$$m_{OB} = \tan(\psi) \quad (20)$$

and $(x_B, y_B)$ are the coordinates of object B, e.g., coordinates in meters converted from latitudinal and longitudinal coordinates in degrees.

At stage 1408, a processor of AT 16 calculates the center O of the position circle by solving together the equations for the lines OA and OB to calculate an intersection. Solving equations (16) and (19) together for the x and y values produces the intersection point, center O. Equations (16) and (19) can be rewritten as a pair of equations with two unknowns (i.e., x and y):

$$m_{OA} * x - y = m_{OA} * x_A - y_A \quad (21)$$

$$m_{OB} * x - y = m_{OB} * x_B - y_B \quad (22)$$

the solution of which provides coordinates $(x_O, y_O)$ for the intersection point, center O, of lines OA and OB. Equations (21) and (22) can be written in matrix form, A*x=b, where:

$$A = \begin{bmatrix} m_{OA} & -1 \\ m_{OB} & -1 \end{bmatrix}, x = \begin{bmatrix} x \\ y \end{bmatrix}, b = \begin{bmatrix} m_{OA} * x_A - y_A \\ m_{OB} * x_B - y_B \end{bmatrix} \quad (23)$$

and the solution can be found using Cramer's rule. The coordinates $(x_O, y_O)$ are in meters with respect to the selected origin point $P_0$ of the local horizontal system.

At stage 1410, a processor of the AT 16 calculates the square of the radius $r^2$ of the position circle. The calculated coordinates $(x_O, y_O)$ for the center O and the coordinates for object A can be used to calculate the square of the radius $r^2$ of the position circle 70:

$$r^2 = (x_A - x_O)^2 + (y_A - y_O)^2 \qquad (24)$$

where equation (24) takes the same form as equations (5) and (6) in reference to the position circles 50 and 52, respectively, of FIG. 5. The equation for the position circle 70 can then be defined as:

$$(x_O - x)^2 + (y_O - y)^2 = r^2 \qquad (25)$$

where equation (25) takes the same form as equations (7) and (8) in reference to the position circles 50 and 52, respectively, of FIG. 5.

The calculations of equations (12) through (24) to determine the coordinates of a center point O and a square of a radius $r^2$ to define the equation (25) for a position circle 70 of FIG. 7 can be made for each of the two position circles 50 and 52 of FIG. 5. The equations for the two position circles 50 and 52 (i.e., equations (7) and (8)) can then be solved to determine the desired intersection point, the position of the AT 16 at point P, as described above in reference to FIGS. 5 and 15.

The accuracy of this position determination technique in the presence of noisy measurements depends on the magnitude of the measured horizontal angles, $\alpha_1$ and $\alpha_2$, which affects the angle at which the position circles 50 and 52 cross. The closer this intersection angle is to 90°, the more accurate the position. Generally, position lines crossing at angles ranging from 30° to 120° provide reasonably accurate positions. The desire for an intersection angle between 30° and 120° translates to a desire for the horizontal angles, $\alpha_1$ and $\alpha_2$, to be in the range from 30° to 120°. For angles outside this range, uncertainty of the position grows rapidly in the presence of noise and measurement errors.

Although only three points are sufficient to determine an observer's position using horizontal angles, one can take advantage of the fact that a single camera image provides hundreds of keypoints. Each triplet of keypoints may be used, as long as the geographical locations of associated objects are known and the angles spanned are wide enough. The described technique of position determination is very inexpensive computationally. Multiple triplets may be selected, rather than just one triplet, and position determination can use all of the selected triplets. For example, three series of points $\{A_i\}, \{B_i\}, \{C_i\}$ for $i=1, \ldots, n$, where n is the number of triplets, can be selected. A corresponding series of positions $P_i$ can be determined for each triplet. As the final refined position, the mean of all the positions $P_i$ can be determined by calculating mean latitude and mean longitude of the series:

$$lat_f = \sum_{i=1}^{n} lat_i \quad long_f = \sum_{i=1}^{n} long_i \qquad (26)$$

where ($lat_f$, $long_f$) are geographical coordinates of the final refined position P, and ($lat_i$, $long_i$) are geographical coordinates of the positions $P_i$. Generally, the higher the number n is, the more accurate the determined position is. In order to improve robustness, outliers can be discarded from the series of positions $P_i$ if the series length is sufficiently big. There are many methods to do this. For example, in a simple case, if n is greater than 5, the minimal and maximal latitude and the minimal and maximal longitude can be discarded from the series, e.g., by excluding them from computations of arithmetic mean to obtain the final refined position P.

Effective Horizontal Angle of View of an Access Terminal with Multiple Cameras

The camera 37 of the AT 16 of FIG. 3, in addition to providing a live video stream to a display, can serve as a tool for position determination, enabling application of navigation techniques on the AT 16. The accuracy of some navigation techniques depends on the magnitude of angles that can be measured by the navigation device, here the camera 38.

Typical cameras used on mobile devices have horizontal angles of view of about 45°. Accuracy of position determination using horizontal angles, which simultaneously measures two adjacent horizontal angles, is dependent on the magnitude of the measured horizontal angles, and it is generally desirable for each angle to be greater than 30°. Except in special cases, a camera with a 45° horizontal angle of view is insufficient to obtain a reliable position using this technique, because the camera cannot measure two adjacent angles, each at least 30°. The horizontal angle of view of a camera is an important parameter for navigation and should not be confused with diagonal angle of view, which is larger and typically used in camera manufacturer specifications.

A possible solution to overcome the angle limitation of a standard camera for use in navigation would be to use a wide-angle camera or a fish-eye camera. A typical wide-angle camera can have a horizontal angle of view of about 60°, which is still too narrow to provide accurate positions in most scenarios if using position determination with horizontal angles. The wide-angle camera is more expensive than a standard camera, while the wide-angle lens introduces significant distortions, requiring careful calibration and compensation. A typical fish-eye camera can have a horizontal angle of view of 110° or more but can be very expensive. Moreover, the distortions introduced by fish-eye lens cannot be fully eliminated even if very expensive calibration and compensation techniques are used.

Mounting two or more standard cameras on an AT 16 in a fan-like configuration with little overlap (e.g., from 5° to 10°) between the horizontal angles of view of individual cameras efficiently increases the joint angle of view without requiring expensive components or introducing large distortions. Maintaining a small overlap between horizontal angles of view of adjacent cameras serves two functions: duplication of information on points most distant from the principal axes of both cameras, which are areas of highest radial distortions introduced by lens, and the ability to combine multiple images from multiple cameras into a single panorama on the device display, which can also improve user experience.

Figure 8:
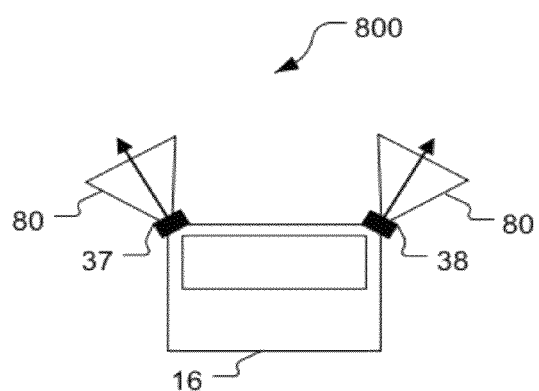
FIG. 8 is a simplified top view of an access terminal shown in FIG. 1 with two mounted cameras.
Figure 9:
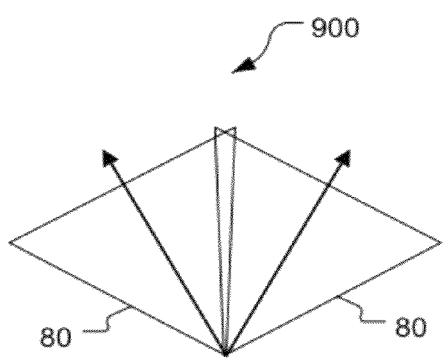
FIG. 9 is a diagram illustrating the angle of view of the cameras shown in FIG. 8.

Referring to FIGS. 8 and 9, two standard cameras 37 and 38 are mounted on an AT 16. The cameras 37 and 38 are standard cameras, each with a 45° horizontal angle of view 80. The effective horizontal angle of view for this configuration can be about 80° to 85°. This configuration provides reliable position determination using horizontal angles for more cases than if using a single standard camera or a single wide-angle camera. The effective angle of view of the optical system is increased while using relatively inexpensive cameras. Moreover, standard cameras with moderate horizontal angles of view have small lens distortions requiring low cost compensation methods.

Figure 10:
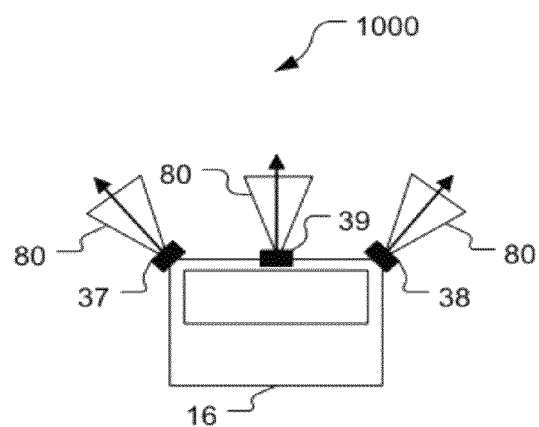
FIG. 10 is a simplified top view of an access terminal shown in FIG. 1 with three mounted cameras.
Figure 11:
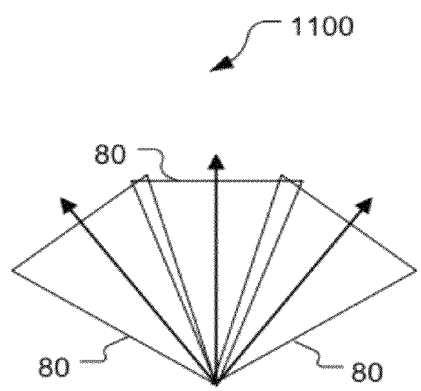
FIG. 11 is a diagram illustrating the angle of view of the cameras shown in FIG. 10.

Referring to FIGS. 10 and 11, three standard cameras 37, 38, and 39 are mounted on an AT 16. The cameras 37, 38, and 39 are standard cameras, each with a 45° horizontal angle of view 80. The effective horizontal angle of view for this configuration can be about 115° to 125°. This configuration provides reliable position determination using horizontal angles for more cases than if using a single fish-eye camera and significantly more cases than if using two standard cameras. In addition to position determination using horizontal angles, other navigation methods are also possible with an effective horizontal angle of view of this width.

Here, the cameras 37 and 38 are grayscale cameras and the camera 39 is a color camera, each with a 45° horizontal angle of view 80. The cameras 37, 38, and 39 are mounted on the AT 16 in a fan-like configuration with little overlap between the individual horizontal angles of view. The single color camera 39 can be used for both navigation and display as the central camera, while the two grayscale cameras 37 and 38 can be used for navigation only as the peripheral cameras. This configuration is less expensive and consumes less power than a configuration using three standard color cameras. Alternatively, a configuration using three standard color cameras provides the ability to combine multiple color images from the multiple cameras into a single color panorama on the device display, which can improve user experience.

The configurations of FIGS. 8 and 10 for mounting multiple inexpensive standard cameras on the ATs 16 significantly increases the effective horizontal angle of view of the optical system and enables efficient and powerful position determination techniques to be implemented on the ATs 16. These techniques are formulated as two-dimensional geometrical problems with existing closed-form analytical solutions that can easily be solved graphically by plotting or directly by solving equations. As a result, computational cost of these methods is minimal as compared to computational costs of determining position using computer vision techniques, which use iterative numerical methods to solve nonlinear three-dimensional problems. For position determination of an AT 16 using horizontal angles, the significantly reduced computational cost relative to using computer vision techniques translates to significant gains in execution time and savings in power consumption.

The technique disclosed above, for simplicity, assumes that the horizontal angles chosen for determining position are adjacent, as shown in FIG. 5. In such case, only three objects A, B, and C are needed, and the intersection points of the position circles 50 and 52 are the middle point B and the observer's position P.

However, the technique works equally well if the horizontal angles are not adjacent, as long as both horizontal angles are at least 30 degrees. This is illustrated in FIG. 17, where four objects A, B, C, and D are shown. The first horizontal angle $\alpha_1$ is subtended on the line segment AB; the second horizontal angle $\alpha_2$ is subtended on the line segment CD. The horizontal angles $\alpha_1$ and $\alpha_2$ have a common vertex at the observer's position, but the horizontal angles $\alpha_1$ and $\alpha_2$ are not adjacent. This variant of the technique is similar to the technique used when the horizontal angles are adjacent. Position circles 170 and 172 centered at points $O_1$ and $O_2$, respectively, are constructed using equations (1) through (8). Once the position circles 170 and 172 are constructed, their intersection points $P_1$ and $P_2$ can be found. Both of these intersection points $P_1$ and $P_2$ are candidates for the refined position P, because from both of these intersection points $P_1$ and $P_2$, the line segment AB is seen at angle $\alpha_1$ and the line segment CD is seen at angle $\alpha_2$. The ambiguity may be resolved by measuring the angle APD at which the observer is seeing the line segment AD, using the technique of determining a horizontal angle between identified image keypoints described above with reference to FIGS. 6 and 13 and equations (1) through (4). The angles $AP_1D$ and $AP_2D$ are then calculated and compared with the measured angle APD. The refined position P is selected as the point from which AD is seen approximately at the measured angle APD.

Considerations Regarding the Description

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of computer-readable media.

The previous description is provided to enable any person skilled in the art to make and/or use the apparatus, systems, and methods described. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. An access terminal of a wireless communication system, the access terminal comprising:
   a transceiver configured to receive wirelessly a plurality of reference keypoints and a geographical location of each respective reference keypoint, each geographical location being a location near an estimated position of the access terminal;
   at least one camera communicatively coupled to the transceiver and configured to capture an image; and
   a processor communicatively coupled to the at least one camera and configured to calculate a refined position of the access terminal, that is more accurate than the estimated position, using first and second horizontal angles between the geographical locations of respective first and second pairs of reference keypoints determined as each corresponding to a respective image keypoint identified within the image captured by the at least one camera.

2. The access terminal of claim 1 wherein the transceiver is further configured to wirelessly transmit the estimated position of the access terminal as a request for the plurality of reference keypoints and geographical locations.

3. The access terminal of claim 1 wherein the processor is further configured to calculate the refined position as an intersection of first and second position circles each defined by the respective first and second horizontal angles.

4. The access terminal of claim 3 wherein the processor is further configured to:
   calculate a center of each of the first and second position circles;
   calculate squares of radius of each of the first and second position circles;
   define an equation for each of the first and second position circles using the respective calculated centers and squares of radius; and
   calculate the intersection of the first and second position circles by solving the equations for the first and second position circles.

5. The access terminal of claim 1 wherein the processor is further configured to select the determined keypoints for each of the first and second pairs so that each of the first and second horizontal angles is between 30 degrees and 120 degrees.

6. The access terminal of claim 1 wherein the transceiver is further configured to wirelessly receive additional reference keypoints and an additional geographical location of each respective additional reference keypoint, each additional geographical location being a location near an estimated future position of the access terminal.

7. The access terminal of claim 6 wherein the processor is further configured to track motion of the access terminal to estimate the future position of the access terminal.

8. The access terminal of claim 1 wherein
   the at least one camera is configured to capture a plurality of images; and
   the processor is further configured to combine the plurality of images into a composite image.

9. The access terminal of claim 8 wherein the at least one camera is a plurality of cameras arranged in a fan-like pattern on the access terminal with a combined effective horizontal angle of view of at least 80 degrees.

10. An apparatus configured to determine position of an access terminal of a wireless communication system, the apparatus comprising:
    means for receiving a plurality of reference keypoints and a geographical location of each respective reference keypoint wirelessly at the access terminal, each geographical location being a location near an estimated position of the access terminal;
    means for determining at least three of the reference keypoints as each corresponding to a respective image keypoint within an image captured by the access terminal; and
    means for calculating a refined position of the access terminal, that is more accurate than the estimated position, using first and second horizontal angles between the geographical locations of respective first and second pairs of the determined keypoints.

11. The apparatus of claim 10 further comprising means for wirelessly transmitting the estimated position of the access terminal from the access terminal as a request for the plurality of reference keypoints and geographical locations.

12. The apparatus of claim 10 further comprising:
    means for identifying a plurality of image keypoints within the image captured by the access terminal; and
    means for searching the plurality of reference keypoints for the identified image keypoints.

13. The apparatus of claim 10 wherein the means for calculating comprise:
    means for calculating a center of each of first and second position circles each defined by the respective first and second horizontal angles;
    means for calculating squares of radius of each of the first and second position circles;
    means for defining an equation for each of the first and second position circles using the respective calculated centers and squares of radius; and
    means for calculating an intersection of the first and second position circles by solving the equations for the first and second position circles, wherein the refined position of the access terminal is calculated as the intersection.

14. The apparatus of claim 10 wherein the means for calculating comprise means for selecting the determined keypoints for each of the first and second pairs so that each of the first and second horizontal angles is between 30 degrees and 120 degrees.

15. The apparatus of claim 10 further comprising means for receiving additional reference keypoints and an additional geographical location of each respective additional reference keypoint wirelessly at the access terminal, each additional geographical location being a location near an estimated future position of the access terminal.

16. A non-transitory computer readable medium comprising:
    a non-transitory processor-readable medium storing processor-readable instructions configured to cause a processor to:
    receive a plurality of reference keypoints and a geographical location of each respective reference keypoint wirelessly at an access terminal of a wireless communication system, each geographical location being a location near an estimated position of the access terminal;

determine at least three of the reference keypoints as each corresponding to a respective image keypoint within an image captured by the access terminal; and calculate a refined position of the access terminal, that is more accurate than the estimated position, using first and second horizontal angles between the geographical locations of respective first and second pairs of the determined keypoints.

17. The non-transitory computer readable medium of claim 16 further comprising instructions configured to cause the processor to transmit wirelessly the estimated position of the access terminal from the access terminal as a request for the plurality of reference keypoints and geographical locations.

18. The non-transitory computer readable medium of claim 16 further comprising instructions configured to cause the processor to:
identify a plurality of image keypoints within the image captured by the access terminal; and
search the plurality of reference keypoints for the identified image keypoints.

19. The non-transitory computer readable medium of claim 16 wherein the instructions configured to cause the processor to calculate the refined position of the access terminal are configured to cause the processor to:
calculate a center of each of first and second position circles each defined by the respective first and second horizontal angles;
calculate squares of radius of each of the first and second position circles;
define an equation for each of the first and second position circles using the respective calculated centers and squares of radius; and
calculate an intersection of the first and second position circles by solving the equations for the first and second position circles, wherein the refined position of the access terminal is calculated as the intersection.

20. The non-transitory computer readable medium of claim 16 wherein the instructions configured to cause the processor to calculate the refined position are configured to cause the processor to select the determined keypoints for each of the first and second pairs so that each of the first and second horizontal angles is between 30 degrees and 120 degrees.

21. A method of determining position of an access terminal of a wireless communication system, the method comprising:
receiving a plurality of reference keypoints and a geographical location of each respective reference keypoint wirelessly at the access terminal, each geographical location being a location near an estimated position of the access terminal;
determining at least three of the reference keypoints as each corresponding to a respective image keypoint within an image captured by the access terminal; and
calculating a refined position of the access terminal, that is more accurate than the estimated position, using first and second horizontal angles between the geographical locations of respective first and second pairs of the determined keypoints.

22. The method of claim 21 further comprising:
identifying a plurality of image keypoints within the image captured by the access terminal; and
searching the plurality of reference keypoints for the identified image keypoints.

23. The method of claim 21 wherein calculating the refined position comprises calculating the refined position as an intersection of first and second position circles each defined by the respective first and second horizontal angles.

24. The method of claim 23 wherein calculating the refined position comprises:
calculating a center of each of the first and second position circles;
calculating squares of radius of each of the first and second position circles;
defining an equation for each of the first and second position circles using the respective calculated centers and squares of radius; and
calculating the intersection of the first and second position circles by solving the equations for the first and second position circles.

25. The method of claim 21 wherein calculating the refined position comprises selecting the determined keypoints for each of the first and second pairs so that each of the first and second horizontal angles is between 30 degrees and 120 degrees.

26. The method of claim 21 further comprising receiving additional reference keypoints and an additional geographical location of each respective additional reference keypoint wirelessly at the access terminal, each additional geographical location being a location near an estimated future position of the access terminal.

27. The method of claim 21 wherein determining at least three of the reference keypoints comprises:
determining a plurality of keypoint correspondences between descriptors of reference keypoints and descriptors of image keypoints, each keypoint correspondence being a pair of a reference keypoint and an image keypoint matched by descriptor similarity; and
performing geometric verification on the plurality of keypoint correspondences until a predetermined number of keypoint correspondences are matched by geometric constraints.

28. The method of claim 21 wherein calculating a refined position of the access terminal comprises:
calculating a plurality of positions of the access terminal, each position calculated using respective first and second horizontal angles between the geographical locations of respective first and second pairs of the determined keypoints; and
calculating the refined position as a mean of the plurality of positions.

29. The method of claim 28 wherein calculating the refined position as the mean of the plurality of positions comprises:
identifying as an outlier at least one of the plurality of positions; and
calculating the refined position as the mean of the plurality of positions with the at least one identified outlier excluded from the calculation.

* * * * *